US006292880B1

United States Patent
Mattis et al.

(12) United States Patent
(10) Patent No.: US 6,292,880 B1
(45) Date of Patent: Sep. 18, 2001

(54) ALIAS-FREE CONTENT-INDEXED OBJECT CACHE

(75) Inventors: Peter Mattis, Belmont; John Plevyak, San Francisco, both of CA (US); Matthew Haines, Laramie, WY (US); Adam Beguelin, San Mateo, CA (US); Brian Totty, Foster City, CA (US); David Gourley, Palo Alto, CA (US)

(73) Assignee: Inktomi Corporation, Foster City, CA (US)

( * ) Notice: Subject to any disclaimer, the term of this patent is extended or adjusted under 35 U.S.C. 154(b) by 0 days.

(21) Appl. No.: 09/060,886

(22) Filed: Apr. 15, 1998

(51) Int. Cl.[7] .................................................... G06F 12/00
(52) U.S. Cl. ................................ 711/216; 711/118; 707/7
(58) Field of Search ............................... 711/118, 3, 123, 711/206, 216, 221; 707/3, 10, 203, 7

(56) References Cited

U.S. PATENT DOCUMENTS

| | | | |
|---|---|---|---|
| 4,918,646 | * 4/1990 | Hirose | 707/3 |
| 5,542,087 | * 7/1996 | Neimat et al. | 707/10 |
| 5,611,049 | 3/1997 | Pitts | 707/10 |
| 5,748,954 | 5/1998 | Mauldin | 707/8 |
| 5,850,443 | * 12/1998 | Oorschot et al. | 380/21 |
| 5,870,763 | 2/1999 | Lomet | 707/202 |
| 5,872,969 | 2/1999 | Copeland et al. | 709/101 |
| 5,978,791 | * 11/1999 | Farber et al. | 707/2 |

* cited by examiner

Primary Examiner—Matthew Kim
Assistant Examiner—Matt Anderson
(74) Attorney, Agent, or Firm—Hickman Palermo Truong & Becker LLP; Christopher J. Palermo; Marcel K. Bingham

(57) ABSTRACT

A method for caching information objects is provided. Information objects are stored in portions of a non-volatile storage device called arenas, which are contiguous regions from which space is allocated in parallel. Objects are contiguously allocated within an arena and are mapped to directory tables that provide an efficient search mechanism. Each object is identified by a name key and a content key. The name key is constructed by applying a hash function to the composition of the name or URL of the object along with implicit or explicit context about the request. The content key is constructed by applying a hash function to the entire contents of the object data. Buckets and blocks in the directory tables store tags and subkeys derived from the keys. Since duplicate objects that have different names will hash to the same content key, the cache can detect duplicate objects even though they have different names, and store only one copy of the object. As a result, cache storage usage is dramatically reduced, and tracking object aliases is not required. The disclosure also encompasses a computer apparatus, computer program product, and computer data signal embodied in a carrier wave that are configured similarly.

26 Claims, 26 Drawing Sheets

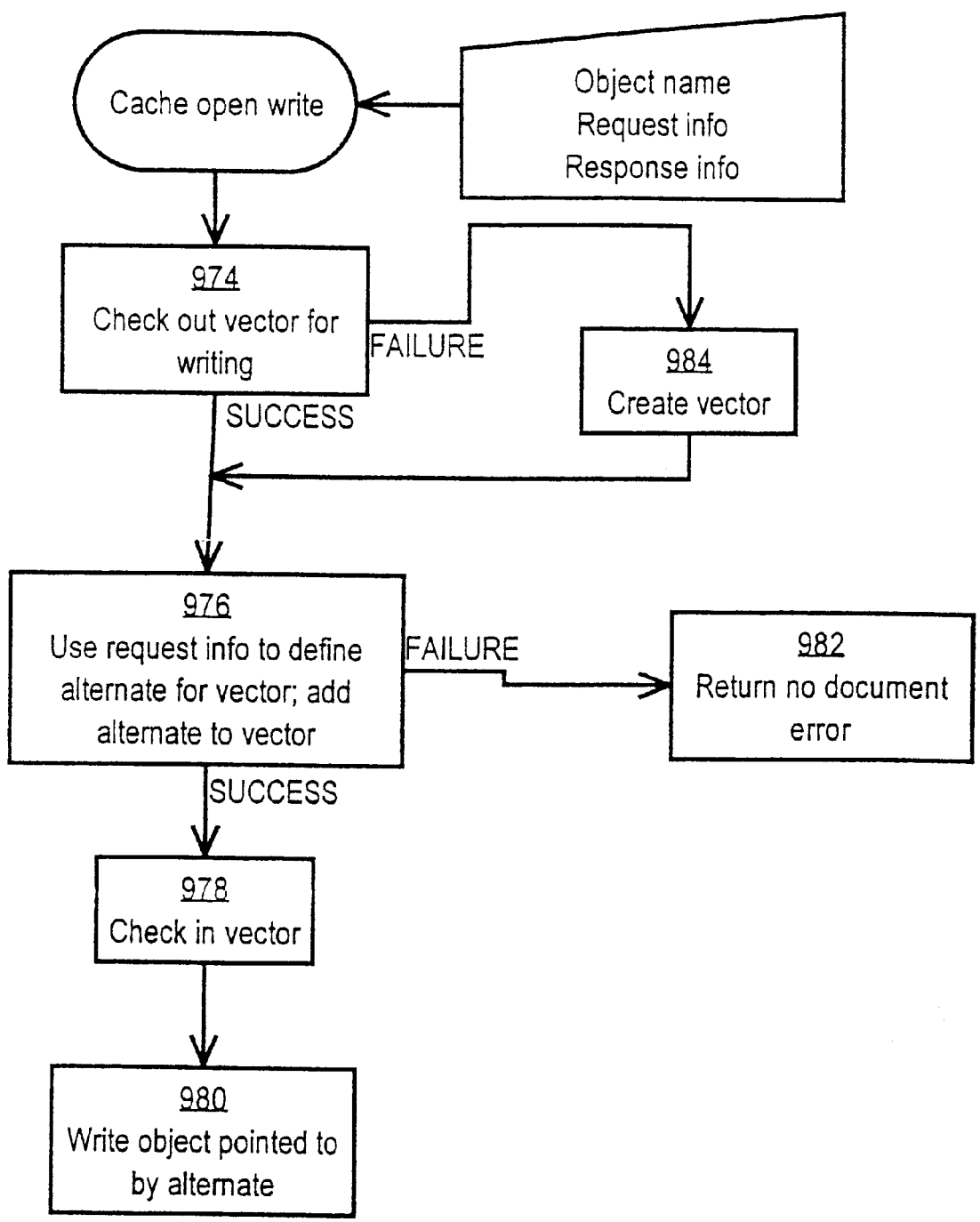

ALIAS-FREE CONTENT-INDEXED OBJECT CACHE

FIELD OF THE INVENTION

The present invention relates to information delivery, and relates more specifically to a cache for information objects that are to be delivered efficiently and at high speed over a network to a client.

BACKGROUND OF THE INVENTION

Several important computer technologies rely, to a great extent, upon rapid delivery of information from a central storage location to remote devices. For example, in the client/server model of computing, one or more servers are used to store information. Client computers or processes are separated from the servers and are connected to the servers using a network. The clients request information from one of the servers by providing a network address of the information. The server locates the information based on the provided network address and transmits it over the network to the client, completing the transaction.

The World Wide Web is a popular application of the client/server computing model. FIG. 1 is a simplified block diagram of the relationship between elements used in a Web system. One or more web clients 10a, 10b, each of which is a computer or a software process such as a browser program, are connected to a global information network 20 called the Internet, either directly or through an intermediary such as an Internet Service Provider, or an online information service.

A web server 40 is likewise connected to the Internet 20 by a network link 42. The web server 40 has one or more internet network addresses and textual host names, associated in an agreed-upon format that is indexed at a central Domain Name Server (DNS). The server contains multimedia information resources, such as documents and images, to be provided to clients upon demand. The server 40 may additionally or alternatively contain software for dynamically generating such resources in response to requests.

The clients 10a, 10b and server 40 communicate using one or more agreed-upon protocols that specify the format of the information that is communicated. A client 10a looks up network address of a particular server using DNS and establishes a connection to the server using a communication protocol called the Hypertext Transfer Protocol (HTTP). A Uniform Resource Locator (URL) uniquely identifies each information object stored on or dynamically generated by the server 40. A URL is a form of network address that identifies the location of information stored in a network.

A key factor that limits the performance of the World Wide Web is the speed with which the server 40 can supply information to a client via the Internet 20. Performance is limited by the speed, reliability, and congestion level of the network route through the Internet, by geographical distance delays, and by server load level. Accordingly, client transaction time can be reduced by storing replicas of popular information objects in repositories geographically dispersed from the server. Each local repository for object replicas is generally referred to as a cache. A client may be able to access replicas from a topologically proximate cache faster than possible from the original web server, while at the same time reducing Internet server traffic.

In one arrangement, as shown in FIG. 1, the cache is located in a proxy server 30 that is logically interposed between the clients 10a, 10b and the server 40. The proxy server provides a "middleman" gateway service, acting as a server to the client, and a client to the server. A proxy server equipped with a cache is called a caching proxy server, or commonly, a "proxy cache".

The proxy cache 30 intercepts requests for resources that are directed from the clients 10a, 10b to the server 40. When the cache in the proxy 30 has a replica of the requested resource that meets certain freshness constraints, the proxy responds to the clients 10a, 10b and serves the resource directly. In this arrangement, the number and volume of data transfers along the link 42 are greatly reduced. As a result, network resources or objects are provided more rapidly to the clients 10a, 10b.

A key problem in such caching is the efficient storage, location, and retrieval of objects in the cache. This document concerns technology related to the storage, location, and retrieval of multimedia objects within a cache. The object storage facility within a cache is called a "cache object store" or "object store".

To effectively handle heavy traffic environments, such as the World Wide Web, a cache object store needs to be able to handle tens or hundreds of millions of different objects, while storing, deleting, and fetching the objects simultaneously. Accordingly, cache performance must not degrade significantly with object count. Performance is the driving goal of cache object stores.

Finding an object in the cache is the most common operation and therefore the cache must be extremely fast in carrying out searches. The key factor that limits cache performance is lookup time. It is desirable to have a cache that can determine whether an object is in the cache (a "hit") or not (a "miss") as fast as possible. In past approaches, caches capable of storing millions of objects have been stored in traditional file system storage structures. Traditional file systems are poorly suited for multimedia object caches because they are tuned for particular object sizes and require multiple disk head movements to examine file system metadata. Object stores can obtain higher lookup performance by dedicating DRAM memory to the task of object lookup, but because there are tens or hundreds of millions of objects, the memory lookup tables must be very compact.

Once an object is located, it must be transferred to the client efficiently. Modern disk drives offer high performance when reading and writing sequential data, but suffer significant performance delays when incurring disk head movements to other parts of the disk. These disk head movements are called "seeks". Disk performance is typically constrained by the drive's rated seeks per second. To optimize performance of a cache, it is desirable to minimize disk seeks, by reading and writing contiguous blocks of data.

Eventually, the object store will become full, and particular objects must be expunged to make room for new content. This process is called "garbage collection". Garbage collection must be efficient enough that it can run continually without providing a significant decrease in system performance, while removing objects that have the least impact on future cache performance.

PAST APPROACHES

In the past, four approaches have been used to structure cache object stores: using the native file system, using a memory-blocked "page" cache, using a database, and using a "cyclone" circular storage structure. Each of these prior approaches has significant disadvantages.

The native file system approach uses the file system of an operating system running on the server to create and manage a cache. File systems are designed for a particular application in mind: storing and retrieving user and system data files. File systems are designed and optimized for file management applications. They are optimized for typical data file sizes and for a relatively small number of files (both total and within one folder/directory). Traditional file systems are not optimized to minimize the number of seeks to open, read/write, and close files. Many file systems incur significant performance penalties to locate and open files when there are large numbers of files present. Typical file systems suffer fragmentation, with small disk blocks scattered around the drive surface, increasing the number of disk seeks required to access data, and wasting storage space. Also, file systems, being designed for user data file management, include facilities irrelevant to cache object stores, and indeed counter-productive to this application. Examples include: support for random access and selective modification, file permissions, support for moving files, support for renaming files, and support for appending to files over time. File systems are also invest significant energy to minimize any data loss, at the expense of performance, both at write time, and to reconstruct the file system after failure. The result is that file systems are relatively poorly for handling the millions of files that can be present in a cache of Web objects. File systems don't efficiently support the large variation in Internet multimedia object size—in particular they typically do not support very small objects or very large objects efficiently. File systems require a large number of disk seeks for metadata traversal and block chaining, poorly support garbage collection, and take time to ensure data integrity and to repair file systems on restart.

The page cache extends file systems with a set of fixed sized memory buffers. Data is staged in and out of these buffers before transmission across the network. This approach wastes significant memory for large objects being sent across slow connections.

The database system approach uses a database system as a cache. Generally, databases are structured to achieve goals that make them inappropriate for use as an object cache. For example, they are structured to optimize transaction processing. To preserve the integrity of each transaction, they use extensive locking. As a result, as a design goal they favor data integrity over performance factors such as speed. In contrast, it is acceptable for an object cache to lose data occasionally, provided that the cache does not corrupt objects, because the data always can be retrieved from the server that is original source of the data. Databases are often optimized for fast write performance, since write speed limits transaction processing speed. However, in an object cache, read speed is equally important. Further, databases are not naturally good at storing a vast variety of object sizes while supporting streaming, pipelined I/O in a virtual memory efficient manner. Databases commonly optimized for fixed record size sizes. Where databases support variable record sizes, they contain support for maintaining object relationships that are redundant, and typically employ slow, virtual memory paging techniques to support streaming, pipelined I/O.

In a cyclonic file system, data is allocated around a circular storage structure. When space becomes full, the oldest data is simply removed. This approach allows for fast allocation of data, but makes it difficult to support large objects without first staging them in memory, suffers problems with fragmentation of data, and typically entails naïve garbage collection that throws out the oldest object, regardless of its popularity. For a modest, active cache with a diverse working set, such first-in-first-out garbage collection can throw objects out before they get to be reused.

The fundamental problem with the above approaches for the design of cache object stores is that the solution isn't optimized for the constraints of the problem. These approaches all represent reapplication of existing technologies to a new application. None of the applications above are ideally suited for the unique constraints of multimedia, streaming, object caches. Not only do the above solutions inherently encumber object caches with inefficiencies due to their imperfect reapplication, but they also are unable to effectively support the more unique requirements of multimedia object caches. These unique requirements include the ability to disambiguate and share redundant content that is identical, but has different names, and the opposite ability to store multiple variants of content with the same name, targeted for particular clients, languages, data types, etc.

Based on the foregoing, there is a clear need to provide an object cache that overcomes the disadvantages of these prior approaches, and is more ideally suited for the unique requirements of multimedia object caches. In particular:

1. there is a need for an object store that can store hundreds of millions of objects of disparate sizes, and a terabyte of content size in a memory efficient manner;
2. there is a need for an object store that can determine if a document is a "hit" or a "miss" quickly, without time-consuming file directory lookups;
3. there is a need for a cache that minimizes the number of disk seeks to read and write objects;
4. there is a need for an object store that permits efficient streaming of data to and from the cache;
5. there is a need for an object store that supports multiple different versions of targeted alternates for the same name;
6. there is a need for an object store that efficiently stores large numbers of objects without content duplication;
7. there is a need for an object store that can be rapidly and efficiently garbage collected in real-time, insightfully selecting the documents to be replaced to improve user response speed, and traffic reduction;
8. there is a need for an object store that that can restart to full operational capacity within seconds after software or hardware failure without data corruption and with minimal data loss.

This document concerns technology directed to accomplishing the foregoing goals. In particular, this document describes methods and structures related to the time-efficient and space-efficient storage, retrieval, and maintenance of objects in a large object store. The technology described herein provides for a cache object store for a high-performance, high-load application having the following general characteristics:

1. High performance, measured in low latency and high throughput for object store operations, and large numbers of concurrent operations;
2. Large cache support, supporting terabyte caches and billions of objects, to handle the Internet's exponential content growth rate;
3. Memory storage space efficiency, so expensive semiconductor memory is used sparingly and effectively;
4. Disk storage space efficiency, so large numbers of Internet object replicas can be stored within the finite disk capacity of the object store;
5. Alias free, so that multiple objects or object variants, with different names, but with the same content identical object content, will have the object content cached only once, shared among the different names;

6. Support for multimedia heterogeneity, efficiently supporting diverse multimedia objects of a multitude of types with size ranging over six orders of magnitude from a few hundred bytes to hundreds of megabytes;
7. Fast, usage-aware garbage collection, so less useful objects can be efficiently removed from the object store to make room for new objects;
8. Data consistency, so programmatic errors and hardware failures do not lead to corrupted data;
9. Fast restartability, so an object cache can begin servicing requests within seconds of restart, without requiring a time-consuming database or file system check operation;
10. Streaming, so large objects can be efficiently pipelined from the object store to slow clients, without staging the entire object into memory;
11. Support for content negotiation, so proxy caches can efficiently and flexibly store variants of objects for the same URL, targeted on client browser, language, or other attribute of the client request; and
12. General-purpose applicability, so that the object store interface is sufficiently flexible to meet the needs of future media types and protocols.

SUMMARY OF THE INVENTION

The foregoing needs and other needs are addressed by the present invention, which provides, in one aspect, a method of delivering an information object to a client from a cache at a server, comprising the steps of (A) establishing a cache table in a memory of the server, the cache table comprising a name key that references a vector of alternates; (B) computing a content key that uniquely identifies the information object by applying a hash function to the information object; and (C) storing the content key in the cache table in one of the alternates. One feature of this aspect is storing, in the cache table, a reference to the location of the information object on a mass storage device, wherein the reference is associated with the content key.

Another feature is computing a content key that uniquely identifies the information object by applying a one-way hash function to the information object. Still another feature is (B) computing a content key that uniquely identifies the information object by applying an MD5 one-way hash function to the information object. Yet another feature is receiving a request to retrieve the information object using the name of the information object; looking up the information object in said cache using the name key; retrieving a vector of alternates associated with the name key; selecting a content key from among the alternates based upon the name key; looking up a location of the information object in the mass storage device based on the content key; and delivering the information object to the client.

According to another feature, the method includes (A1) computing the name key based upon the name of the information object and a context of the request. In yet another feature, step (A1) comprises the steps of computing the name key by applying a one-way hash function to the name of the information object combined with information describing a context of the request.

In still another feature, step (A1) comprises the steps of computing the name key by applying the MD5 one-way hash function to the name of the information object combined with information describing a context of the request. Still another feature involves (D) establishing in the cache table, mappings from name keys to vectors of alternates; and (E) storing the content key referencing the content object in each alternate vector element; and (F) establishing in the cache table, mappings from content keys to object content data.

The invention also encompasses an apparatus, computer system, computer program product, and a computer data signal embodied in a carrier wave configured according to the foregoing aspects, and other aspects.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9F is a flow diagram of a cache write process;

DETAILED DESCRIPTION OF THE PREFERRED EMBODIMENT

A method and apparatus for caching information objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

TRAFFIC SERVER

Figure 1:
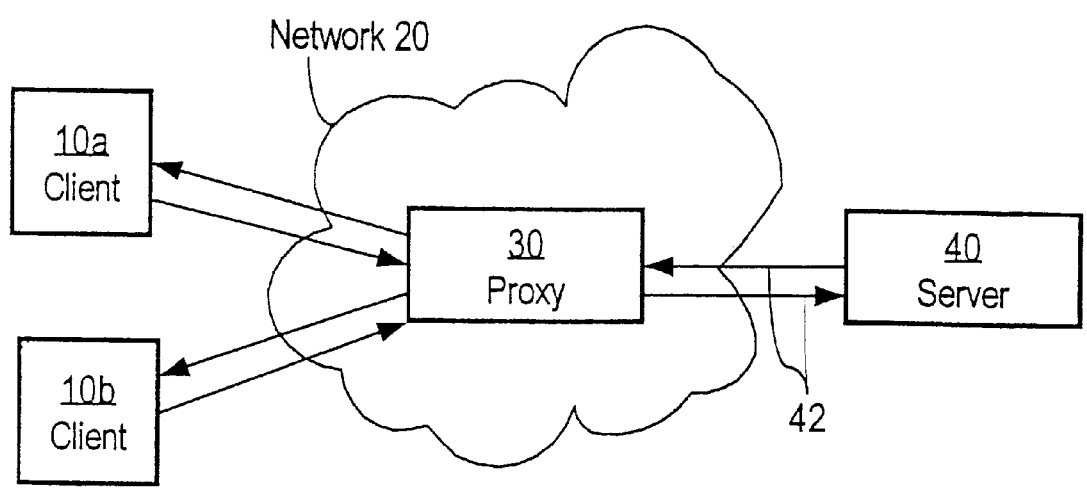
FIG. 1 is a block diagram of a client/server relationship.
Figure 2:
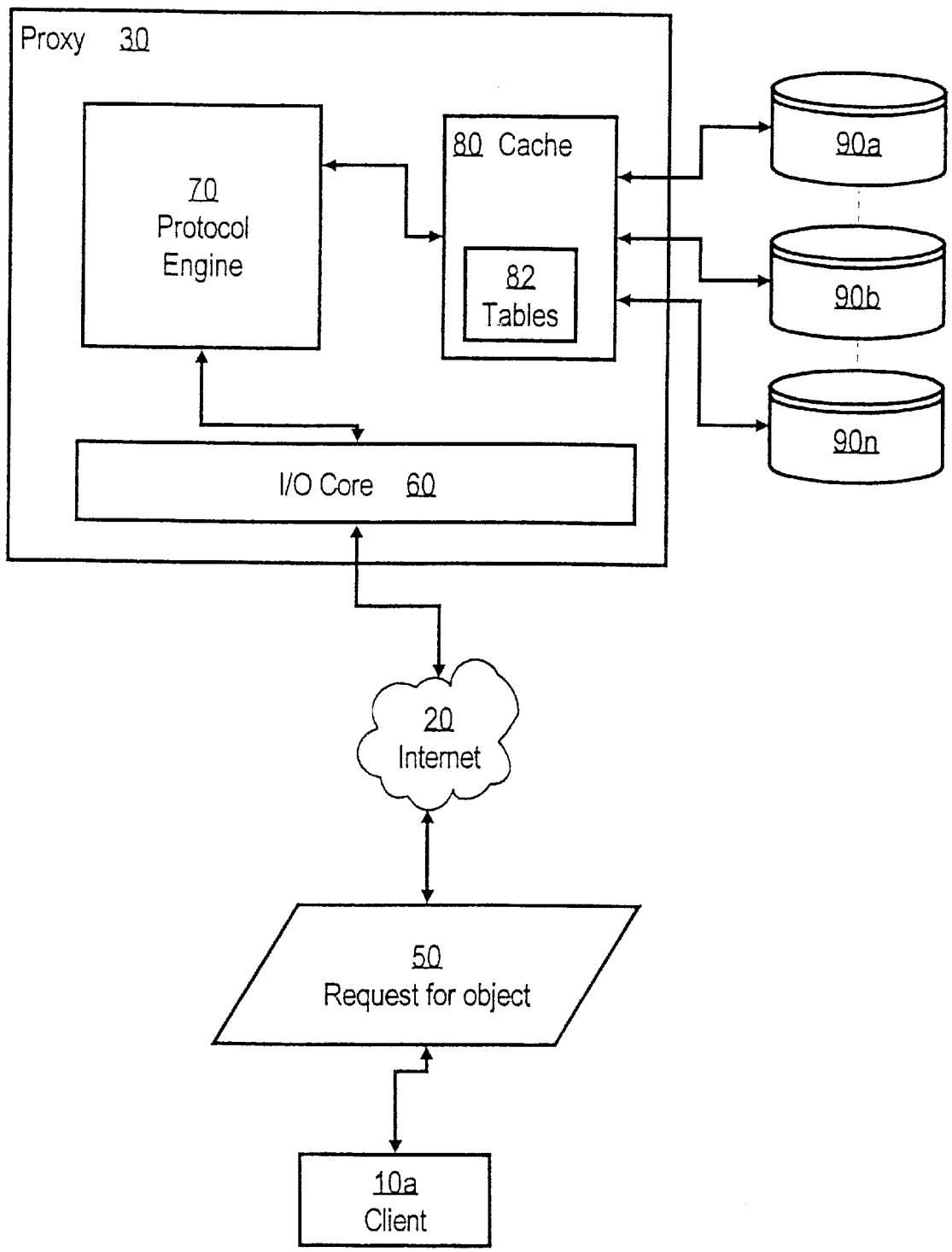
FIG. 2 is a block diagram of a traffic server.

FIG. 2 is a block diagram of the general structure of certain elements of a proxy 30. In one embodiment, the proxy 30 is called a traffic server and comprises one or more computer programs or processes that operate on a computer workstation of the type described further below. A client 10a directs a request 50 for an object to the proxy 30 via the Internet 20. In this context, the term "object" means a network resource or any discrete element of information that is delivered from a server. Examples of objects include Web pages or documents, graphic images, files, text documents, and objects created by Web application programs during execution of the programs, or other elements stored on a server that is accessible through the Internet 20. Alternatively, the client 10a is connected to the proxy 30 through a network other than the Internet.

The incoming request 50 arrives at an input/output (I/O) core 60 of the proxy 30. The I/O core 60 functions to adjust the rate of data received or delivered by the proxy to match the data transmission speed of the link between the client 10a and the Internet 20. In a preferred embodiment, the I/O core 60 is implemented in the form of a circularly arranged set of buckets that are disposed between input buffers and output buffers that are coupled to the proxy 30 and the Internet 20. Connections among the proxy 30 and one or more clients 10a are stored in the buckets. Each bucket in the set is successively examined, and each connection in the bucket is polled. During polling, the amount of information that has accumulated in a buffer associated with the connection since the last poll is determined. Based on the amount, a period value associated with the connection is adjusted. The connection is then stored in a different bucket that is generally identified by the sum of the current bucket number and the period value. Polling continues with the next connection and the next bucket. In this way, the elapsed time between successive polls of a connection automatically adjusts to the actual operating bandwidth or data communication speed of the connection.

The I/O core 60 passes the request 50 to a protocol engine 70 that is coupled to the I/O core 60 and to a cache 80. The protocol engine 70 functions to parse the request 50 and determine what type of substantive action is embodied in the request 50. Based on information in the request 50, the protocol engine 70 provides a command to the cache 80 to carry out a particular operation. In an embodiment, the cache 80 is implemented in one or more computer programs that are accessible to the protocol engine 70 using an application programming interface (API). In this embodiment, the protocol engine decodes the request 50 and performs a function call to the API of the cache 80. The function call includes, as parameter values, information derived from the request 50.

The cache 80 is coupled to send and receive information to and from the protocol engine 70 and to interact with one or more non-volatile mass storage devices 90a–90n. In an embodiment, the storage devices 90a–90n are high-capacity, fast disk drives. The cache 80 also interacts with data tables 82 that are described in more detail herein.

OBJECT CACHE INDEXING

CONTENT INDEXING

In the preferred embodiment, the cache 80 stores objects on the storage devices 90a–90n. Popular objects are also replicated into a cache. In the preferred embodiment, the cache has finite size, and is stored in main memory or RAM of the proxy 30.

Objects on disk are indexed by fixed sized locators, called keys. Keys are used to index into directories that point to the location of objects on disk, and to metadata about the objects. There are two types of keys, called "name keys" and "object keys". Name keys are used to index metadata about a named object, and object keys are used to index true object content. Name keys are used to convert URLs and other information resource names into a metadata structure that contains object keys for the object data. As will be discussed subsequently, this two-level indexing structure facilitates the ability to associate multiple alternate objects with a single name, while at the same time maintaining a single copy of any object content on disk, shared between multiple different names or alternates.

Unlike other cache systems that use the name or URL of an object as the key by which the object is referenced, embodiments of the invention use a "fingerprint" of the content that makes up the object itself, to locate the object. Keys generated from the content of the indexed object are referred to herein as object keys. Specifically, the object key 56 is a unique fingerprint or compressed representation of the contents of the object 52. Preferably, a copy of the object 52 is provided as input to a hash function 54, and its output is the object key 56. For example, a file or other representation of the object 52 is provided as input to the hash function, which reads each byte of the file and generates a portion of the object key 56, until the entire file has been read. In this way, an object key 56 is generated based upon the entire contents of the object 52 rather than its name. Since the keys are content-based, and serve as indexes into tables of the cache 80, the cache is referred to as a content-indexed cache. Given a content fingerprint key, the content can easily be found.

In this embodiment, content indexing enables the cache 80 to detect duplicate objects that have different names but the same content. Such duplicates will be detected because objects having identical content will hash to the same key value even if the objects have different names.

For example, assume that the server 40 is storing, in one subdirectory, a software program comprising an executable file that is 10 megabytes in size, named "IE4.exe". Assume further that the server 40 is storing, in a different subdirectory, a copy of the same file, named "Internet Explorer.exe". The server 40 is an anonymous FTP server that can deliver copies of the files over an HTTP connection using the FTP protocol. In past approaches, when one or more clients request the two files, the cache stores a copy of each of the files in cache storage, and indexes each of the files under its name in the cache. As a result, the cache must use 20 megabytes of storage for two objects that are identical except for the name.

In embodiments of the invention, as discussed in more detail herein, for each of the objects, the cache creates a name key and an object key. The name keys are created by applying a hash function to the name of the object. The object keys are created by applying a hash function to the content of the object. As a result, for the two exemplary objects described above, two different name keys are created, but the object key is the same. When the first object is stored in the cache, its name key and object key are stored in the cache. When the second object is stored in the cache thereafter, its name key is stored in the cache. However, the cache detects the prior identical object key entry, and does not store a duplicate object key entry; instead, the cache stores a reference to the same object key entry in association with the name key, and deletes the new, redundant object. As a result, only 10 megabytes of object storage is required. Thus, the cache detects duplicate objects that have different names, and stores only one permanent copy of each such object.

Figure 3A:
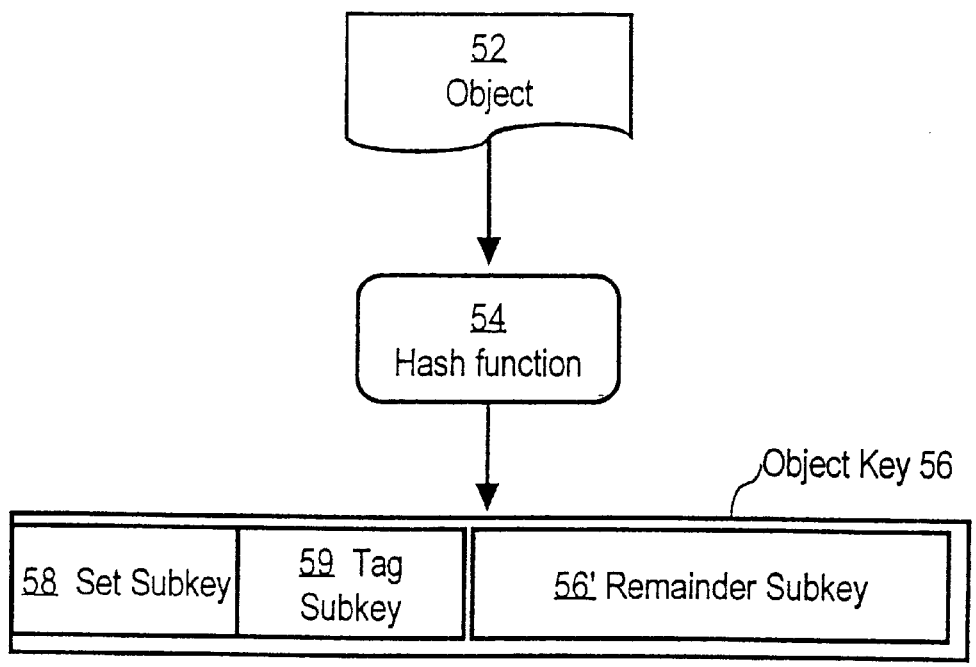
FIG. 3A is a block diagram of transformation of an object into a key.

FIG. 3A is a block diagram of mechanisms used to generate an object key 56 for an object 52. When client 10a requests an object 52, and the object is not found in the cache 80 using the processes described herein, the cache retrieves the object from a server and generates a object key 56 for storing the object in the cache.

Directories are the data structures that map keys to locations on disk. It is advisable to keep all or most of the contents of the directories in memory to provide for fast lookups. This requires directory entries to be small, permitting a large number of entries in a feasible amount of memory. Further, because 50% of the accesses are expected not to be stored in cache, we want to determine cache misses quickly, without expending precious disk seeks. Such fast miss optimizations dedicate scarce disk head movements to real data transfers, not unsuccessful speculative lookups. Finally, to make lookups fast via hashing search techniques, directory entries are fixed size.

Keys are carefully structured to be fixed size and small, for the reasons described earlier. Furthermore, keys are partitioned into subkeys for the purposes of storage efficiency and fast lookups. Misses can be identified quickly by detecting differences in just a small portion of keys. For this reason, instead of searching a full directory table containing complete keys, misses are filtered quickly using a table of small subkeys called a "tag table". Furthermore, statistical properties of large bit vectors can be exploited to create space-efficient keys that support large numbers of cache objects with small space requirements.

According to one embodiment, the object key 56 comprises a set subkey 58 and a tag subkey 59. The set subkey 58 and tag subkey 59 comprise a subset of the bits that make up the complete object key 56. For example, when the complete object key 56 is 128 bits in length, the subkeys 58, 59 can be 16 bits, 27 bits, or any other portion of the complete key. The subkeys 58, 59 are used in certain operations, which are described below, in which the subkeys yield results that are nearly as accurate as when the complete key is used. In this context, "accurate" means that use of the subkeys causes a hit in the cache to the correct object as often as when the complete key is used.

This accuracy property is known as "smoothness" and is a characteristic of a certain preferred subset of hash functions. An example of a hash function suitable for use in an embodiment is the MD5 hash function, which is described in detail in B. Schneier, "Applied Cryptography" (New York: John Wiley & Sons, Inc., 2d ed. 1996), at pp. 429–431 and pp. 436–441. The MD5 hash function generates a 128-bit key from an input data stream having an arbitrary length. Generally the MD5 hash function and other one-way hash functions are used in the cryptography field to generate secure keys for messages or documents that are to be transmitted over secure channels. General hashing table construction and search techniques are described in detail in D. Knuth, "The Art of Computer Programming: Vol. 3, Sorting and Searching," at 506–549 (Reading, Ma.: Addison-Wesley, 1973).

NAME INDEXING

Unfortunately, requests for objects typically do not identify requested objects using the object keys for the objects. Rather, requests typically identify requested objects by name. The format of the name may vary from implementation to implementation based on the environment in which the cache is used. For example, the object name may be a file system name, a network address, or a URL.

According to one aspect of the invention, the object key for a requested object is indexed under a "name key" that is generated based on the object name. Thus, retrieval of an object in response to a request is a two phase process, where a name key is used to locate the object key, and the object key is used to locate the object itself.

Figure 3B:
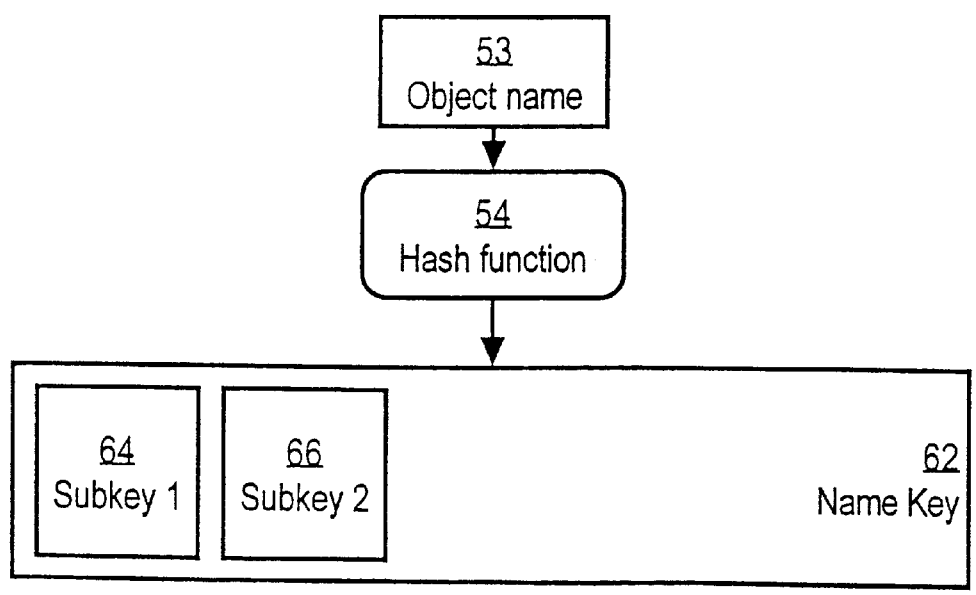
FIG. 3B is a block diagram of transformation of an object name into a key.

FIG. 3B is a block diagram of mechanisms used to generate a name key 62 based on an object name 53. According to one embodiment, the same hash function 54 that is used to generate object keys is used to generate name keys. Thus, the name keys will have the same length and smoothness characteristics of the object keys.

Similar to object key 56, the name key 62 comprises set and tag subkeys 64, 66. The subkeys 64, 66 comprise a subset of the bits that make up the complete name key 62. For example, when the complete name key 62 is 128 bits in length, the first and second subkeys 64, 66 can be 16 bits, 27 bits, or any other portion of the complete key.

SEARCHING BY OBJECT OR NAME KEY

Figure 4A:
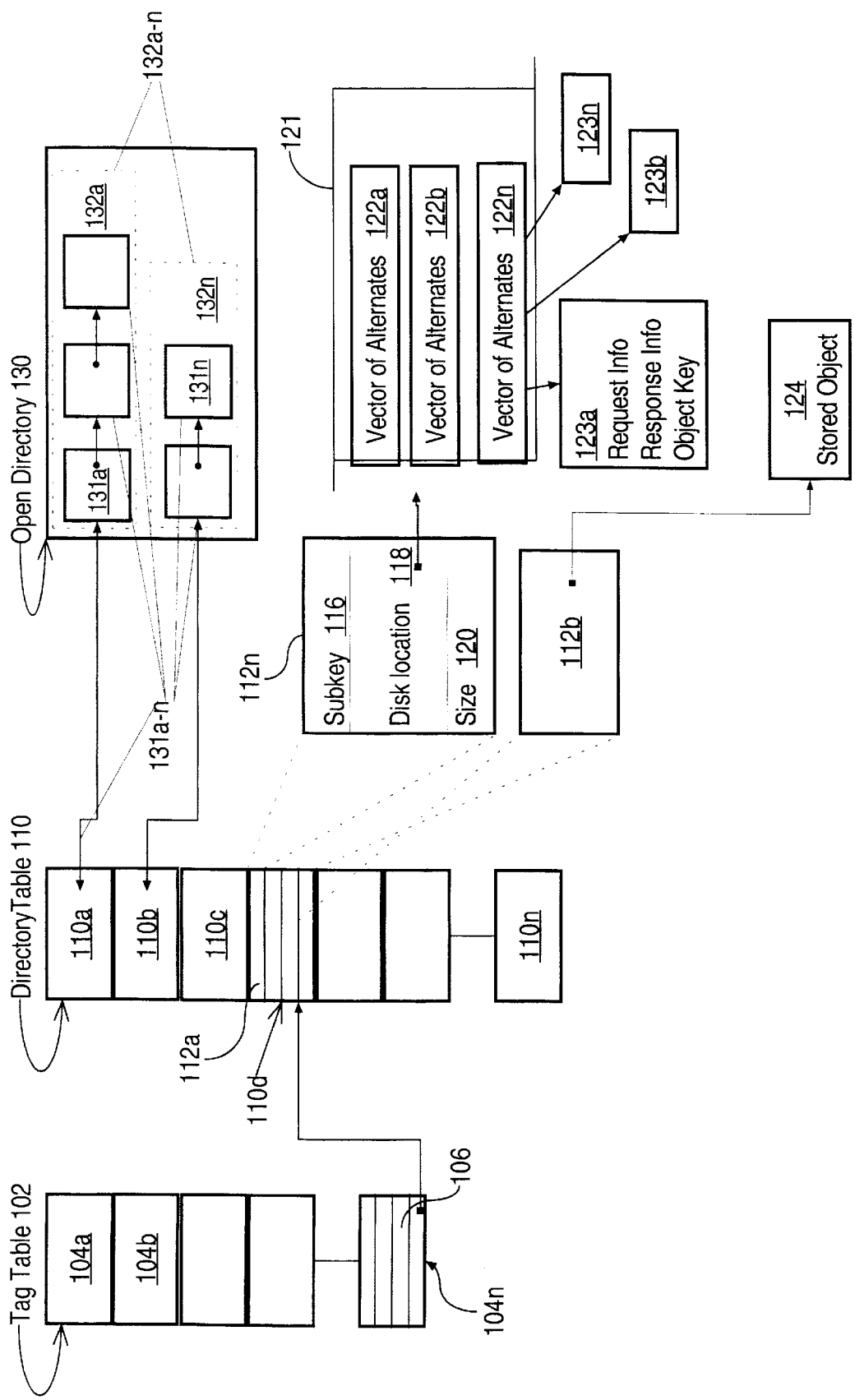
FIG. 4A is a block diagram of a cache.

Preferably, the cache 80 comprises certain data structures that are stored in the memory of a computer system or in its non-volatile storage devices, such as disks. FIG. 4 is a block diagram of the general structure of the cache 80. The cache 80 generally comprises a Tag Table 102, a Directory Table 110, an Open Directory table 130, and a set of pools 200a through 200n, coupled together using logical references as described further below.

The Tag Table 102 and the Directory Table 110 are organized as set associative hash tables. The Tag Table 102, the Directory Table 110, and the Open Directory table 130 correspond to the tables 82 shown in FIG. 2. For the purposes of explanation, it shall be assumed that an index search is being performed based on object key 56. However, the Tag Table 102 and Directory Table 110 operate in the same fashion when traversed based on a name key 62.

The Tag Table 102 is a set-associative array of sets 104a, 104b, through 104n. The tag table is designed to be small enough to fit in main memory. Its purpose is to quickly detect misses, whereby using only a small subset of the bits in the key a determination can be made that the key is not stored in the cache. The designation 104n is used to indicate that no particular number of sets is required in the Tag Table 102. As shown in the case of set 104n, each of the sets 104a–104n comprises a plurality of blocks 106.

In the preferred embodiment, the object key 56 is 128 bits in length. The set subkey 58 is used to identify and select one of the sets 104a–104n. Preferably, the set subkey 58 is approximately 18 bits in length. The tag subkey 59 is used to reference one of the entries 106 within a selected set. Preferably, the tag subkey 59 is approximately 16 bits in length, but may be as small as zero bits in cases in which there are many sets. In such cases, the tag table would be a bit vector.

The mechanism used to identify or refer to an element may vary from implementation to implementation, and may include associative references, pointers, or a combination thereof. In this context, the term "reference" indicates that one element identifies or refers to another element. A remainder subkey 56' consists of the remaining bits of the key 56. The set subkey, tag subkey, and remainder subkey are sometimes abbreviated s, t, and r, respectively.

The preferred structure of the Tag Table 102, in which each entry contains a relatively small amount of information enables the Tag Table to be stored in fast, volatile main memory such as RAM. Thus, the structure of the Tag Table 102 facilitates rapid operation of the cache. The blocks in the Directory Table 110, on the other hand, include much more information as described below, and consequently, portions of the Directory Table may reside on magnetic disk media as opposed to fast DRAM memory at any given time.

The Directory Table 110 comprises a plurality of sets 110*a*–110*n*. Each of the sets 110*a*–110*n* has a fixed size, and each comprises a plurality of blocks 112*a*–112*n*. In the preferred embodiment, there is a predetermined, constant number of sets and a predetermined, constant number of blocks in each set. As shown in the case of block 112*n*, each of the blocks 112*a*–112*n* stores a third, remainder subkey value 116, a disk location value 118, and a size value 120. In the preferred embodiment, the remainder subkey value 116 is a 27-bit portion of the 128-bit complete object key 56, and the comprises bits of the complete object key 56 that are disjoint from the bits that comprise the set or tag subkeys 58, 59.

In a search, the subkey values stored in the entry 106 of the Tag Table 102 matches or references one of the sets 110*a*–110*n*, as indicated by the arrow in FIG. 4 that connects the entry 106 to the set 110*d*. As an example, consider the 12-bit key and four-bit first and second subkeys described above. Assume that the set subkey value 1111 matches set 104*n* of the Tag Table 102, and the tag subkey value 0000 matches entry 106 of set 104*n*. The match of the tag subkey value 0000 indicates that there is a corresponding entry in set 110*d* of the Directory Table 110 associated with the key prefix 11110000. When one of the sets 110*a*–110*n* is selected in this manner, the blocks within the selected set are searched linearly to find a block, such as block 112*a*, that contains the remainder subkey value 116 that matches a corresponding portion of the object key 56. If a match is found, then there is almost always a hit in the cache. There is a small possibility of a miss if the first, second and third subkeys don't comprise the entire key. If there is a hit, the referenced object is then located based on information contained in the block, retrieved from one of the cache storage devices 90*a*–90*n*, and provided to the client 10*a*, as described further below.

Unlike the Tag Table, whose job is to quickly determine rule out misses with the minimal use of RAM memory, each block within Directory Table 110 includes a full pointer to a disk location. The item referenced by the disk location value 118 varies depending on the source from which the key was produced. If the key was produced based on the content of an object, as described above, then the disk location value 118 indicates the location of a stored object 124 (or a first fragment thereof), as shown in FIG. 4 in the case of block 112*b*. If the key is a name key, then as shown for block 112*n*, the disk location value 118 indicates the location of one or more Vectors of Alternates 122, each of which stores one or more object keys for the object whose name was used to generate the name key. A single Tag Table 102 and a single Directory Table 110 are shown in FIG. 4 merely by way of example. However, additional tables that provide additional levels of storage and indexing may be employed in alternate embodiments.

In the preferred arrangement, when a search of the cache is conducted, a hit or miss will occur in the Tag Table 102 very quickly. If there is a hit in the Tag Table 102, then there is a very high probability that a corresponding entry will exist in the Directory Table 110. The high probability results from the fact that a hit in the Tag Table 102 means that the cache holds an object whose full key shares X identical bits to the received key, where X is the number of bits of the concatenation of the set and tag subkeys 58 and 59. Because misses can be identified quickly, the cache 80 operates rapidly and efficiently, because hits and misses are detected quickly using the Tag Table 102 in memory without requiring the entire Directory Table 110 to reside in main memory.

When the cache is searched based on object key 56, the set subkey 58 is used to index one of the sets 104*a*–104*n* in Tag Table 102. Once the set associated with subkey 58 is identified, a linear search is performed through the elements in the set to identify an entry whose tag matches the tag subkey 59.

In a search for an object 52 requested from the cache 80 by a client 10*a*, when one of the sets 104*a*–104*n* is selected using the set subkey 58, a linear search of all the elements 106 in that set is carried out. The search seeks a match of the tag subkey 59 to one the entries. If a match is found, then there is a hit in the Tag Table 102 for the requested object, and the cache 80 proceeds to seek a hit in the Directory Table 110.

For purposes of example, assume that the object key is a 12-bit key having a value of 111100001010, the set subkey comprises the first four bits of the object key having a value of 1111, and the tag subkey comprises the next four bits of the object key having a value of 0000. In production use the number of remainder bits would be significantly larger than the set and tag bits to affect memory savings. The cache identifies set 15 (1111) as the set to examine in the Tag Table 102. The cache searches for an entry within that set that contains a tag 0000. If there is no such entry, then a miss occurs in the Tag Table 102. If there is such an entry, then the cache proceeds to check the remaining bits in Directory Table 110 for a match.

MULTI-LEVEL DIRECTORY TABLE

In one embodiment, the Directory Table 110 contains multiple sets each composed of a fixed number of elements. Each element contains the remainder tag and a disk pointer. Large caches will contain large numbers of objects, which will require large numbers of elements in the directory table. This can create tables too large to be cost-effectively stored in main memory.

For example, if a cache was configured with 128 million directory table elements, and each element was represented by a modest 8 bytes of storage, 1GByte of memory would be requires to store the directory table, which is more memory than is common on contemporary workstation computers. Because few of these objects will be actively accessed at any time, there is a desire to migrate the underutilized entries onto disk while leaving higher utilized entries in main memory.

Figure 4B:
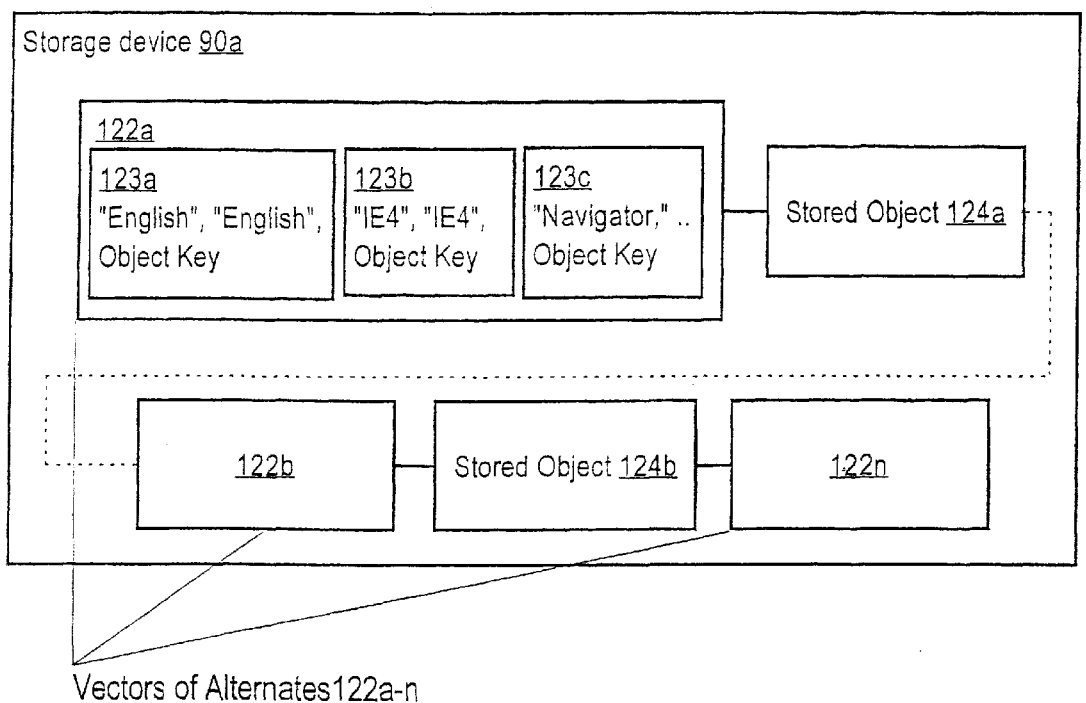
FIG. 4B is a block diagram of a storage mechanism for Vectors of Alternates.
Figure 4C:
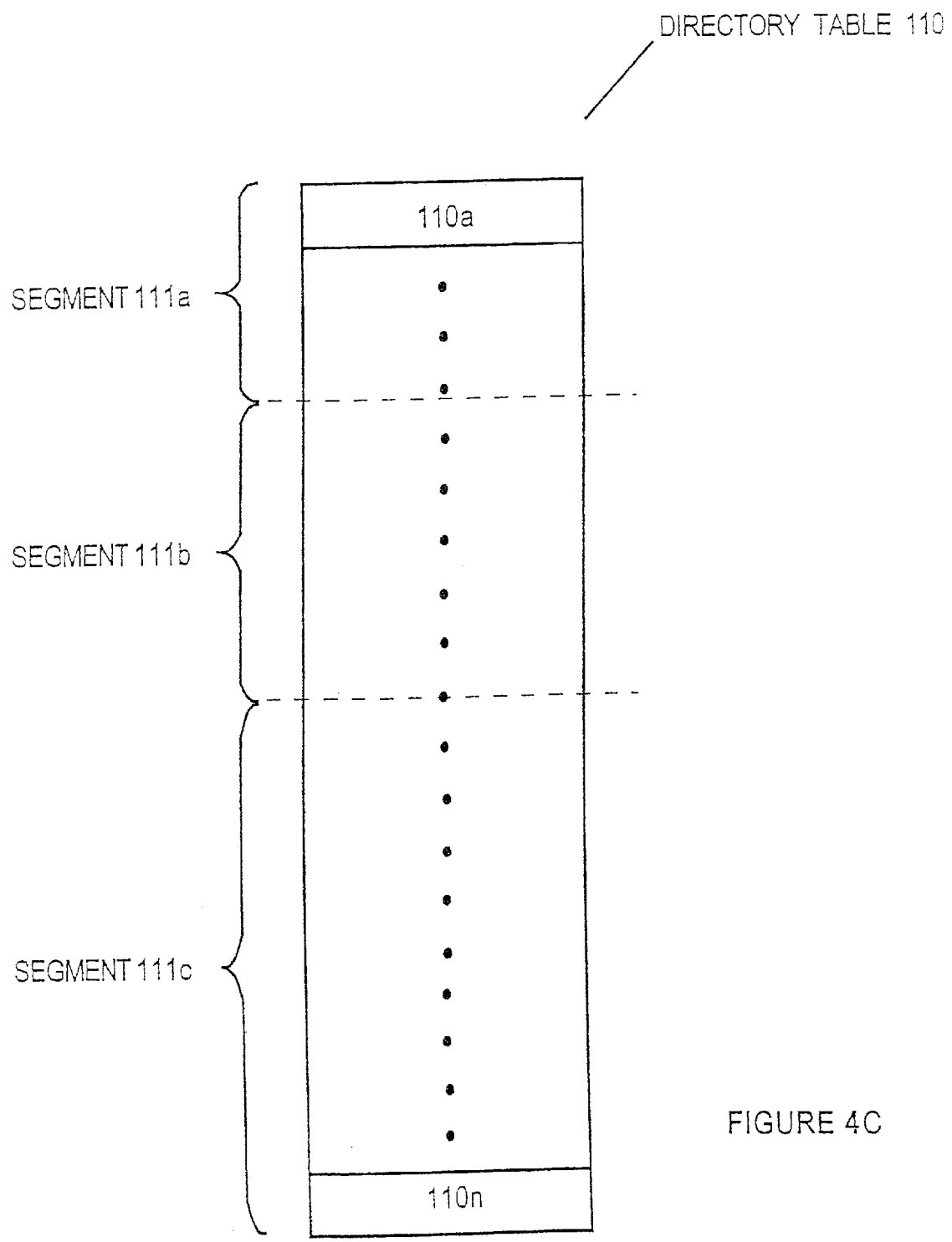
FIG. 4C is a block diagram of multi-segment directory table.

FIG. 4C is a diagram of a multi-level directory mechanism. The directory table 110 is partitioned into segments 111*a*, 111*b*, 111*c*. In the preferred embodiments, there are two or three segments 111*a*–111*c*, although a larger number of segments may be used. The first segment 111*a* is the smallest, and fits in main memory such as the main memory 1106 of the computer system shown in FIG. 11 and discussed in detail below. The second and third segments 111*b*, 111*c* are progressively larger. The second and third segments 111*b*, 111*c* are coupled through a paging mechanism to a mass storage device 1110 such as a disk. The second and third segments 111*b*, 111*c* dynamically page data in from the disk if requested data is not present in the main memory 1106.

As directory elements are accessed more often, the directory elements are moved to successively higher segment among the segments 111*a*–111*c* of the multi-level directory.

Thus, frequently accessed directory elements are more likely to be stored in main memory 1106. The most popular elements appear in the highest and smallest segment 111a of the directory, and will all be present in main memory 1106. Popularity of entries is tracked using a small counter that is several bits in length. This counter is updated as described in the section SCALED COUNTER UPDATING. This multi-level directory approximates the performance of in-memory hash tables, while providing cost-effective aggregate storage capacity for terabyte-sized caches, by placing inactive elements on disk.

DIRECTORY PAGING

As discussed, in a preferred embodiment, the Directory Table 110 is implemented as a multi-level hash table. Portions of the Directory Table may reside out of main memory, on disk. Data for the Directory Table is paged in and out of disk on demand. A preferred embodiment of this mechanism uses direct disk I/O to carefully control the timing of paging to and from disk and the amount of information that is paged.

Another embodiment of this approach exploits a feature of UNIX-type operating systems to map files directly into virtual memory segments. In this approach, the cache maps the Directory Table into virtual memory using the UNIX mmap( ) facility. For example, a mmap request is provided to the operating system, with a pointer to a file or disk location as a parameter. The mmap request operates as a request to map the referenced file or disk location to a memory location. Thereafter, the operating system automatically loads portions of the referenced file or disk location from disk into memory as necessary.

Further, when the memory location is updated or accessed, the memory version of the object is written back to disk as necessary. In this way, native operating system mechanisms are used to manage backup storage of the tables in non-volatile devices. However, at any given time it is typical that only a portion of the Directory Table 110 is located in main memory.

In a typical embodiment, the Directory Table and Open Directory are stored using a "striping" technique. Each set of the tables is stored on a different physical disk drive. For example, set 110a of Directory Table 110 is stored on storage device 90a, set 110b is stored on storage device 110b, etc. In this arrangement, the number of seek operations needed for a disk drive head to arrive at a set is reduced, thereby improving speed and efficiency of the cache.

It should be noted when paging data between disk and memory certain safeguards are taken to ensure that the information stored in memory is consistent with the corresponding information stored in a non-volatile storage device. The techniques used to provide efficient consistency in object caches are summarized in the context of garbage collection, in the section named SYNCHRONIZATION AND CONSISTENCY ENFORCEMENT.

VECTOR OF ALTERNATES

As mentioned above, it is possible for a single URL to map to an object that has numerous versions. These versions are called "alternates". In systems that do not use an object cache, versions are selected as follows. The client 10a establishes an HTTP connection to the server 40 through the Internet 20. The client provides information about itself in an HTTP message that requests an object from the server. For example, an HTTP request for an object contains header information that identifies the Web browser used by the client, the version of the browser, the language preferred by the client, and the type of media content preferred by the client. When the server 40 receives the HTTP request, it extracts the header information, and selects a variant of the object 52 based upon the values of the header information. The selected alternate is returned to the client 10a in a response message. This type of variant selection is promoted by the emerging HTTP/1.1 hypertext transfer protocol.

It is important for a cache object store to efficiently maintain copies of alternates for a URL. If a single object is always served from cache in response to any URL requests, a browser may receive content that is different than that obtained directly from a server. For this reason, each name key in the directory table 110 maps to one of the vectors of alternates 122a–122n, which enable the cache 80 to select one version of an object from among a plurality of related versions. For example, the object 52 may be a Web page and server 40 can store versions of the object in the English, French, and Japanese languages.

Each Vector of Alternates 122a–122n is a structure that stores a plurality of alternate records 123a–123n. Each of the alternate records 123a–123n is a structure that stores information that describes an alternative version of the requested object 52. For example the information describes a particular browser version, a human language in which the object has been prepared, etc. The alternate records also each store a full object key that identifies an object that contains the alternative version. In the preferred embodiment, each of the alternate records 123a–123n stores request information, response information, and an object key 56.

Because a single popular object name may map to many alternates, in one embodiment a cache composes explicit or implicit request context with the object name to reduce the number of elements in the vector. For example, the User-Agent header of a Web client request (which indicates the particular browser application) may be concatenated with a web URL to form the name key. By including contextual information directly in the key, the number of alternates in each vector is reduced, at the cost of more entries in the directory table. In practice, the particular headers and implicit context concatenated with the information object name is configurable.

These Vectors of Alternates 122a–122n support the correct processing of HTTP/1.1 negotiated content. Request and response information contained in the headers of HTTP/1.1 messages is used to determine which of the alternate records 123a–123n can be used to satisfy a particular request. When cache 80 receives requests for objects, the requests typically contain header information in addition to the name (or URL) of the desired object. As explained above, the name is used to locate the appropriate Vector of Alternates. Once the appropriate Vector of Alternates is found, the header information is used to select the appropriate alternate record for the request.

Specifically, in the cache 80, the header information is received and analyzed. The cache 80 seeks to match values found in the header information with request information of one of the alternate records 123a–123n. For example, when the cache 80 is used in the context of the World Wide Web, requests for objects are provided to a server containing the cache in the form of HTTP requests.

The cache 80 examines information in an HTTP request to determine which of the alternate records 123a–123n to use. For example, the HTTP request might contain request information indicating that the requesting client 10a is running the Netscape Navigator browser program, version 3.0, and prefers German text. Using this information, the cache 80 searches the alternate records 123a through 123n for response information that matches the browser version and the client's locale from the request information. If a match is found, then the cache retrieves the object key from the matching alternate and uses the object key to retrieve the corresponding object from the cache.

The cache optimizes the object chosen by matching the criteria specified in the client request. The client request may specify minimal acceptance criteria (e.g. the document must be a JPEG image, or the document must be Latin). The client request may also specify comparative weighting criteria for matches (e.g. will accept a GIF image with weight 0.5, but prefer a JPEG image at weight 0.75). The numeric weightings are accumulated across all constraint axes to create a final weighting that is optimized.

The object key is used to retrieve the object in the manner described above. Specifically, a subkey portion of the object key is used to initiate another search of the Tag Table 102 and the Directory Table 110, seeking a hit for the subkey value. If there is a hit in both the Tag and Directory Tables, then the block in the Directory Table arrived at using the subkey values will always reference a stored object (e.g. stored object 124). Thus, using the Vector of Alternates 122, the cache 80 can handle requests for objects having multiple versions and deliver the correct version to the requesting client 10a.

In FIG. 4, only one exemplary Vector of Alternates 122 and one exemplary stored object 124 are shown. However, in practice the cache 80 includes any number of vectors and disk blocks, depending on the number of objects that are indexed and the number of alternative versions associated with the objects.

READ AHEAD

FIG. 4B is a diagram showing a storage arrangement for exemplary Vectors of Alternates 122a–122n. The system attempts to aggregate data object contiguously after the metadata. Because seeks are time-consuming but sequential reads are fast, performance is improved by consolidating data with metadata, and pre-fetching data after the metadata.

In one of the storage devices 90a–90n, each of the Vectors of Alternates 122a–122n is stored in a location that is contiguous to the stored objects 124a–124b that are associated with the alternate records 123a–123n represented in the vector. For example, a Vector of Alternates 122a stores alternate records 123a–123c. The alternate record 123a stores request and response information indicating that a stored object 124a associated with the alternate record is prepared in the English language. Another alternate record 123b stores information indicating that its associated stored object 124b is intended for use with the Microsoft Internet Explorer browser. The stored objects 124a, 124b referenced by the alternate records 123a, 123b are stored contiguously with the Vectors of alternates 122a–122n.

The Size value 120 within each alternate record indicates the total size in bytes of one of the associated Vectors of Alternates 122a–122n and the stored object 124. When the cache 80 references a Vector of Alternates 122a based on the disk location value 118, the cache reads the number of bytes indicated by the Size value. For example, in the case of the Vectors of Alternates shown in FIG. 4B, the Size value would indicate the length of the Vector of Alternate 122a plus the length of its associated stored object 124a. Accordingly, by referencing the Size value, the cache 80 reads the vector as well as the stored object. In this way, the cache 80 "reads ahead" of the Vector of Alternates 122 and retrieves all of the objects 50 from the storage devices 90a–90n. As a result, both the Vector of Alternates and the objects 50 are read from the storage device using a single seek operation by the storage device. Consequently, when there is a hit in the cache 80, in the majority of cases (where there is a single alternate) the requested object 52 is retrieved from a storage device using a single seek.

When the disk location value 118 directly references a stored object 124, rather than a Vector of Alternates 122, the Size value 120 indicates the size of the object as stored in the disk block. This value is used to facilitate single-seek retrieval of objects, as explained further herein.

THE OPEN DIRECTORY

In one embodiment, the cache 80 further comprises an Open Directory 130. The Open Directory 130 stores a plurality of linked lists 132a–132n, which are themselves composed of a plurality of list entries 131a–131n. Each of the linked lists 132a–132n is associated with one of the sets 110a–110n in the Directory Table 110. The Open Directory 130 is stored in volatile main memory. Preferably, each list entry 131a–131n of the Open Directory 130 stores an object key that facilitates associative lookup of an information object. For example, each item within each linked list 132a–132n stores a complete object key 56 for an object 52.

The Open Directory accounts for objects that are currently undergoing transactions, to provide mutual exclusion against conflicting operations. For example, the Open Directory is useful in safeguarding against overwriting or deleting an object that is currently being read. The Open Directory also buffers changes to the Directory Table 110 before they are given permanent effect in the Directory Table 110. At an appropriate point, as discussed below, a synchronization operation is executed to move the changes reflected in the Open Directory 130 to the Directory Table 110. This prevents corruption of the Directory Table 110 in the event of an unexpected system failure or crash.

Further, in one embodiment, when an object is requested from the cache 80, the Open Directory 130 is consulted first; it is considered the most likely place to yield a hit, because it contains references to the most recently used information objects. The Open Directory in this form serves as a cache in main memory for popular data.

DISK DATA LAYOUT AND AGGREGATION

After the Open Directory 130, Tag Table 102 and Directory Table 110 have been accessed to determine the location of a stored object 124, the object must be read from storage and transmitted to the user that requested the object. To improve the efficiency of read operations that are used to retrieve objects 50 from the cache 80, certain data aggregation techniques are used when initially storing the data. When data is initially stored on disk according to the data aggregation techniques described herein, the efficiency of subsequent reads is improved greatly.

Figure 6:
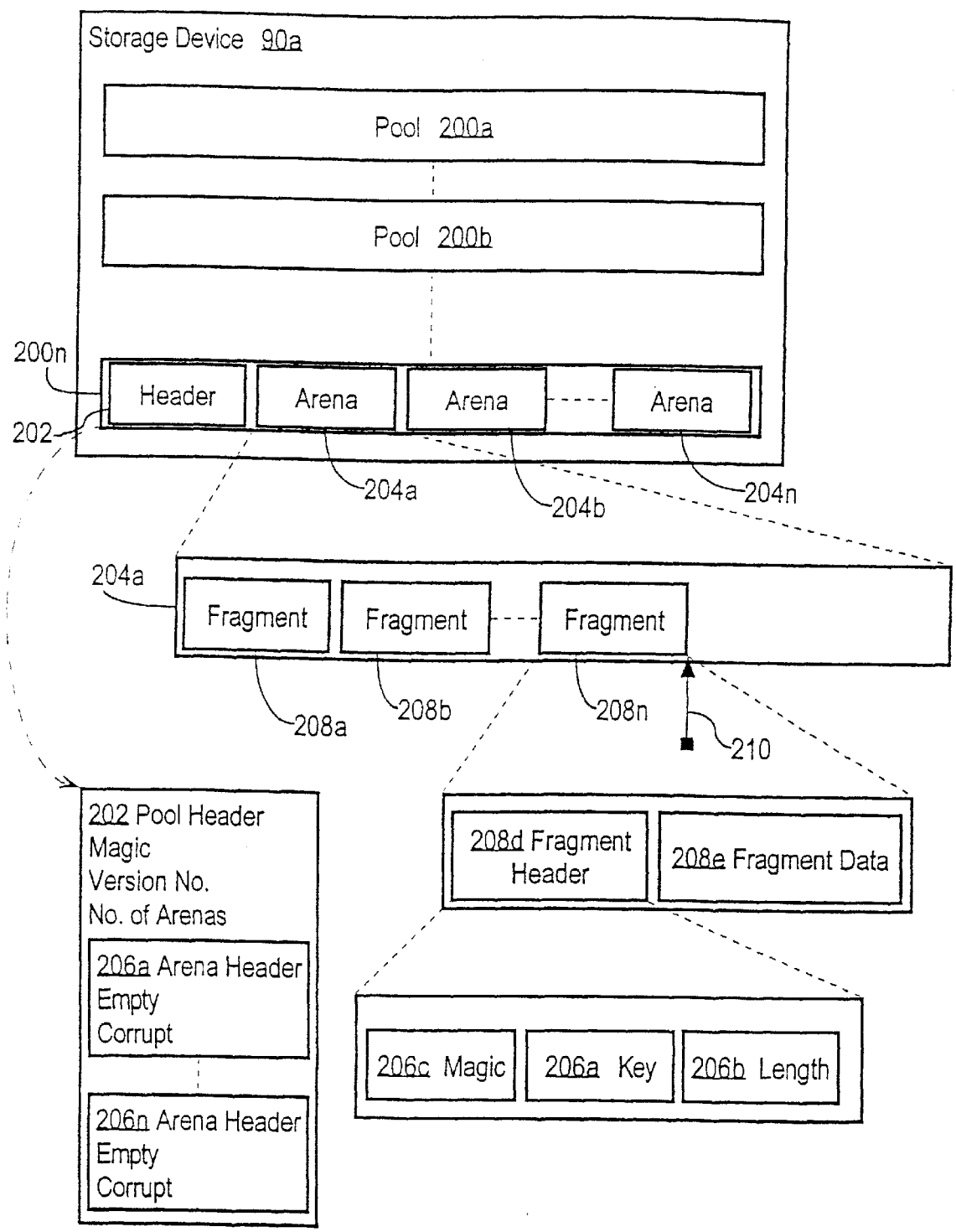
FIG. 6 is a block diagram of a storage device and its contents.

FIG. 6 is a block diagram of a data storage arrangement for use with the cache 80 and the storage devices 90a–90n. A storage device 90a, such as a disk drive, stores data in plurality of pools 200a–200n. A pool is a segment or chunk of contiguous disk space, preferably up to 4 Gbytes in size. Pools can be allocated from pieces of files, or segments of raw disk partitions.

Each pool, such as pool 200n, comprises a header 202 and a plurality of fixed size storage spaces referred to herein as "arenas" 204a through 204n. The size of the arenas is preferably configurable or changeable to enable optimization of performance of the cache 80. In the preferred embodiment, each of the arenas 204a–204n is a block approximately 512 Kbytes to 2 Mbytes in size.

Data to be written to arenas is staged or temporarily stored or staged in a "write aggregation buffer" in memory. This buffer accumulates data, and when full, the buffer is written contiguously, in one seek, to an arena on disk. The write aggregation buffer improves the performance of writes, and permits sector alignment of data, so data items can be directly read from raw disk devices.

The write aggregation buffer is large enough to hold the entire contents of an arena. Data is first staged and consolidated in the write aggregation buffer, before it is dropped into the (empty) arena on disk. The write aggregation buffer also contains a free top pointer that is used to allocate storage out of the aggregation buffer as it is filling, an identifier naming the arena it is covering, and a reference count for the number of active users of the arena.

Each pool header 202 stores a Magic number, a Version No. value, a No. of Arenas value, and one or more arena headers 206a–206n. The Magic number is used solely for internal consistency checks. The Version No. value stores a version number of the program or process that created the arenas 206a–206n in the pool. It is used for consistency checks to ensure that the currently executing version of the cache 80 can properly read and write the arenas. The No. of Arenas value stores a count of the number of arenas that are contained within the pool.

For each of the arenas in the pool, the pool header 202 stores information in one of the arena headers 206a–206n. Each arena header stores two one-bit values that indicate whether the corresponding arena is empty and whether the arena has become corrupted (e.g. due to physical disk surface damage, or application error).

As shown in FIG. 6 in the exemplary case of an arena 204a, each arena comprises one or more data fragments 208a–208n. Each fragment 208a–208n comprises a fragment header 208d and fragment data 208e. The fragment data 208e is the actual data for an object that is stored in the cache 80. The data for an entire stored object may reside within a single fragment, or may be stored within multiple fragments that may reside in multiple arenas. The fragment header 208d stores a Magic number value 206c, a key value 206a and a length value 206b.

The length value 206b represents the length in bytes of the fragment, including both the fragment header 208d and the fragment data 208e. The key value 206a is a copy of the object key, stored in its entirety, of the object whose data is in the fragment. Thus, the key value 206c can be used to look up the directory block that points to the first fragment that holds data of the object whose data is contained in the fragment.

According to one embodiment, the complete object key 56 is stored in association with the last fragment associated with a particular object. When an object 52 is stored in the cache 80 for the first time, the object key 56 is computed incrementally as object data is read from the originating server 40. Thus, the final value of the object key 56 cannot be known until the entire object 52 is read. The object key 56 is written at the end of the chain of fragments used to store the object, because the value of the key is not known until the last fragment is written, and because modifying existing data on disk is slow. In alternate embodiments, the fragment header can store other metadata that describes the fragment or object.

The write aggregation buffer contains a "free top pointer" 210 indicating the topmost free area of the buffer 204a. The top pointer 210 identifies the current boundary between used and available space within the buffer 204a. The top pointer 210 is stored to enable the cache 80 to determine where to write additional fragments in the buffer. Everything below (or, in FIG. 6, to the left of) the top pointer 210 contains or has already been allocated to receive valid data. The area of the arena 204a above the top pointer 210 (to the right in FIG. 6) is available for allocation for other information objects.

Preferably, each fragment includes a maximum of 32 kilobytes of data. Fragments start and end on standard 512-byte boundaries of the storage device 90a. In the context of the World Wide Web, most objects are relatively small, generally less than 32K in size.

Each arena may have one of two states at a given time: the empty state or the occupied state. The current state of an arena is reflected by the Empty value stored in each arena header 206a–206n. In the occupied state, some portion of the arena is storing usable data. A list of all arenas that are currently empty or free is stored in memory. For example, main memory of the workstation that runs the cache 80 stores an array of pointers to empty arenas. In alternate embodiments, additional information can be stored in the header 206a–n of each arena. For example, the header may store values indicating the number of deleted information objects contained in the arena, and a timestamp indicating when garbage collection was carried out last on the arena.

Although three fragments are shown in FIG. 6 as an example, in practice any number of fragments may be stored in an arena until the capacity of the arena is reached. In addition, the number of pools and the number of arenas shown in FIG. 6 are merely exemplary, and any number may be used.

Figure 7:
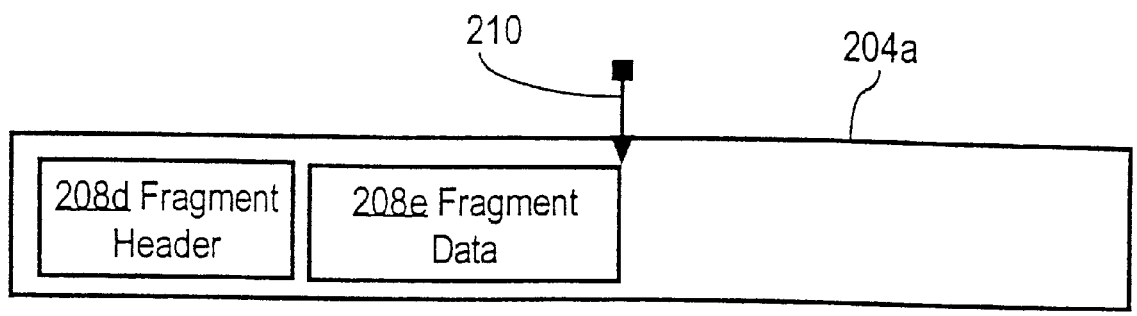
FIG. 7 is a block diagram showing the structure of a pool.

The above-described structure of the arenas facilitates certain consistent and secure mechanisms of updating data for objects that are stored in fragments of the arenas. FIG. 7 is a block diagram relating to updating one of the arenas 204a–204n of FIG. 6. FIG. 7 shows an arena 204a containing a first information object 208b having a header 206 and data fragments 208a–208c. Top pointer 210 points to the topmost active portion of the arena 204a, which is the end of the data segment 208c. Preferably, the Directory Table is updated only after a complete information object has been written to an arena, including header and data, and only after the top pointer of the arena has been moved successfully. For example, a complete information object is written to the arena 204a above the top pointer 210, and the top pointer is moved to indicate the new top free location of the arena. Only then is the Directory Table updated.

The delayed updating of the Directory Table is carried out to ensure that the Directory Table remains accurate even if a catastrophic system failure occurs during one of the other steps. For example, if a disk drive or other element of the system crashes before completion of one of the steps, no adverse effect occurs. In such a case, the arena 204a will contain corrupt or incomplete data, but the cache 80 will effectively ignore such data because nothing in the Directory Table 110, indexes or hash tables is referencing the corrupt data. In addition, using the Garbage Collection process described herein, the corrupt or incomplete data is eventually reclaimed.

MULTI-FRAGMENT OBJECTS

In FIG. 3, the directory table block 112b that is arrived at based on the object key of object 52 includes a pointer directly to the fragment in which the object 52 is stored. This assumes that object 52 has been stored in a single fragment.

However, large objects may not always fit into a single fragment, for two reasons. First, fragments have a fixed maximum size (preferred value is 32 KB). Objects greater than 32 KB will be fragmented. Second, the system must pre-reserve space in the write aggregation buffer for new objects. If the object store does not know the size of the incoming object, it may guess wrong. The server may also misrepresent the true (larger) size of the object. In both cases, the object store would create a chain of fragments to handle the overflow.

Figure 5:
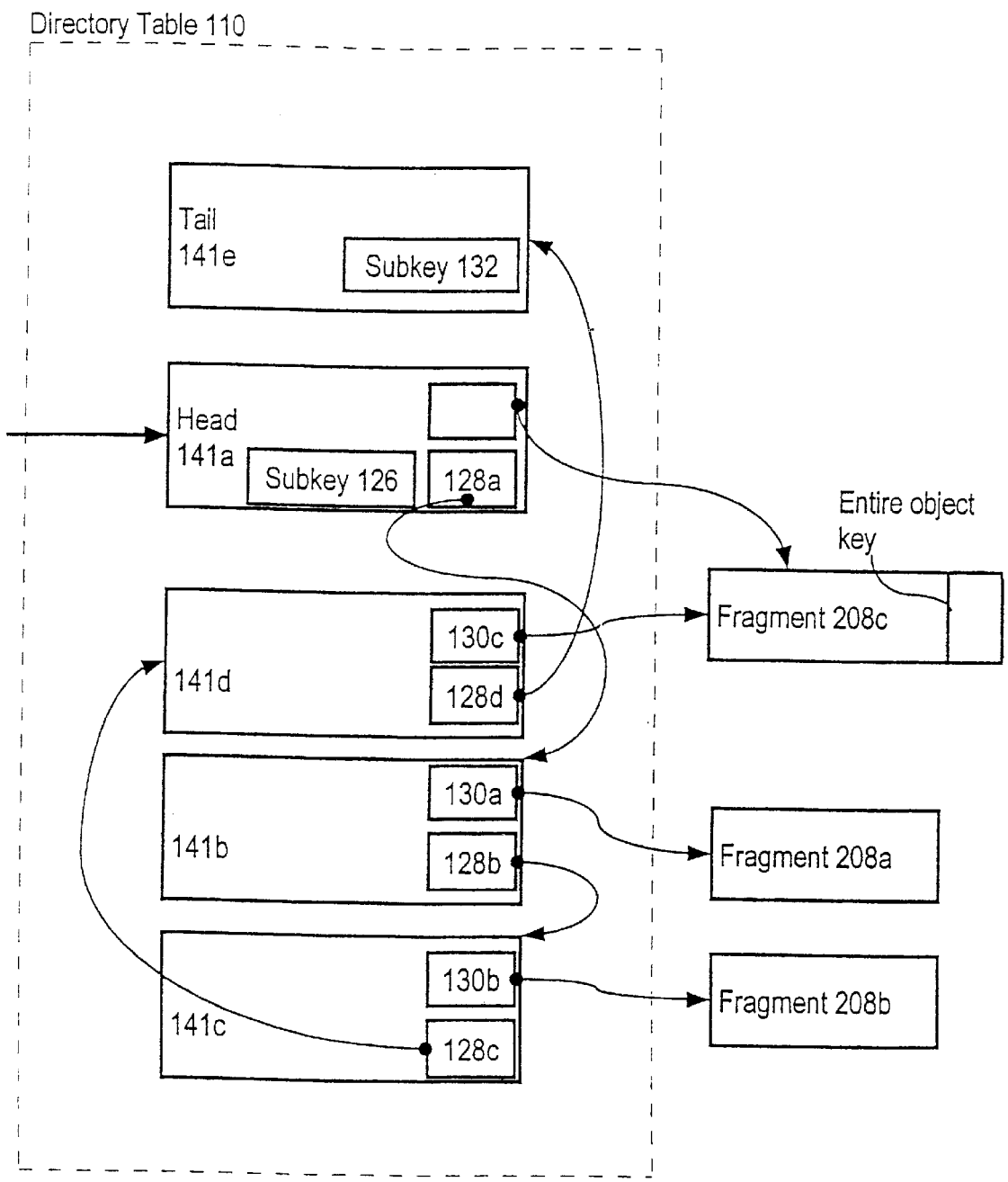
FIG. 5 is a block diagram of pointers relating to data fragments.

Therefore, a mechanism is provided for tracking which fragments contain data from objects that are split between fragments. FIG. 5 is a block diagram of a preferred structure for keeping track of related fragments.

For the purpose of explanation, it shall be assumed that an object X is stored in three fragments 208*a*, 208*b* and 208*c* on storage devices 90*a*–90*n*. Using the object key for object X, the cache traverses the Tag Table to arrive at a particular block 141*a* within the Directory Table 110. Block 141*a* is the head of a chain of blocks that identify successive fragments that contain the object X. In the illustrated example, the chain is includes blocks 141*a*, 141*b*, 141*c*, 141*d* and 141*e*, in that order, and is formed by pointers 128*a* through 128*d*.

According to one embodiment, the head block 141*a* comprises a subkey value 126 and a block pointer 128*a*. Preferably, the subkey value 126 is 96 bits in length and comprises a subset of the value of the object key 56 for object X. The value of the block pointer 128*a* references the next block 141*b* in the chain.

Directory table block 141*b* comprises a fragment pointer 130*a* and a block pointer 128*b*. The fragment pointer 130*a* references a fragment 208*a* that stores the first portion of the data for the object X. The block pointer 128*b* of pointer block 141*b* references the next pointer block 141*c* in the chain. Like pointer block 141*b*, pointer block 141*c* has a fragment pointer 130*b* that references a fragment 208*b*. The block pointer 128*c* of pointer block 141*c* references the next pointer block 141*d* in the chain. Like pointer block 141*c*, pointer block 141*d* has a fragment pointer 130*b* that references a fragment 208*c*.

The object store needs a mechanism to chain fragments together. Traditional disk block chaining schemes require modifying pre-existing data on disk, to change the previous chain-link pointers to point the new next block values. Modification of pre-existing disk data is time-consuming and creates complexities relating to consistency in the face of unplanned process termination.

According to one embodiment of the invention, the need to patch new fragment pointers into extant fragments is removed by using "iterative functional pointers". Each fragment is assigned a key, and the key of the next fragment is assigned as a simple iterative function of the previous fragment's key. In this manner, fragments can be chained simply by defining the key of the next fragment, rather than by modifying the pointer of the previous fragment.

For example, the block pointer 128*a* is computed by applying a function to the value of subkey 126. The block pointer value 128*b* is computed by applying a function to the value of the block pointer 128*a*. The function used to compute the pointer values is not critical, and many different functions can be used. The function can be a simple accumulating function such that $$key_n = key_{n-1} + 1$$

or the function can be a complex function such as the MD5 hash function $$key_n = MD5(key_{n-1})$$

The only requirement is that the range of possible key values should be sufficiently large, and the iteration should be sufficiently selected, so that the chances of range collision or cyclic looping are small. In the very unlikely event of key collision, the object will be deleted from the cache.

The last pointer block 141*d* in the chain has a block pointer 128*d* that points to a tail block 141*e*. The tail block 141*e* comprises a reference to the first block 141*a* in the chain. According to one embodiment, the reference contained in the tail block 141*e* a 96-bit subkey 132 of the object key of object X. The cache can use the 96-bit subkey 132 to locate the head block 128*a* of the chain. The tail block 141*e*, and the looped pointer arrangement it provides, enables the cache 80 to locate all blocks in a chain, starting from any block in the chain.

Three fragments 208*a*, 208*b*, and 208*c* are shown in FIG. 5 merely by way of example. In practice, an information object may occupy or reference any number of fragments, each of which would be identified by its own pointer block within the Directory Table 110.

When the object 52 is read from the storage device, the last fragment is read first to ensure that the content MD5 key stored there matches the directory key value. This test is done as a "sanity check" to ensure that the correct object has been located. If there is no match, a collision has occurred and an exception is raised.

SPACE ALLOCATION

Figure 10A:
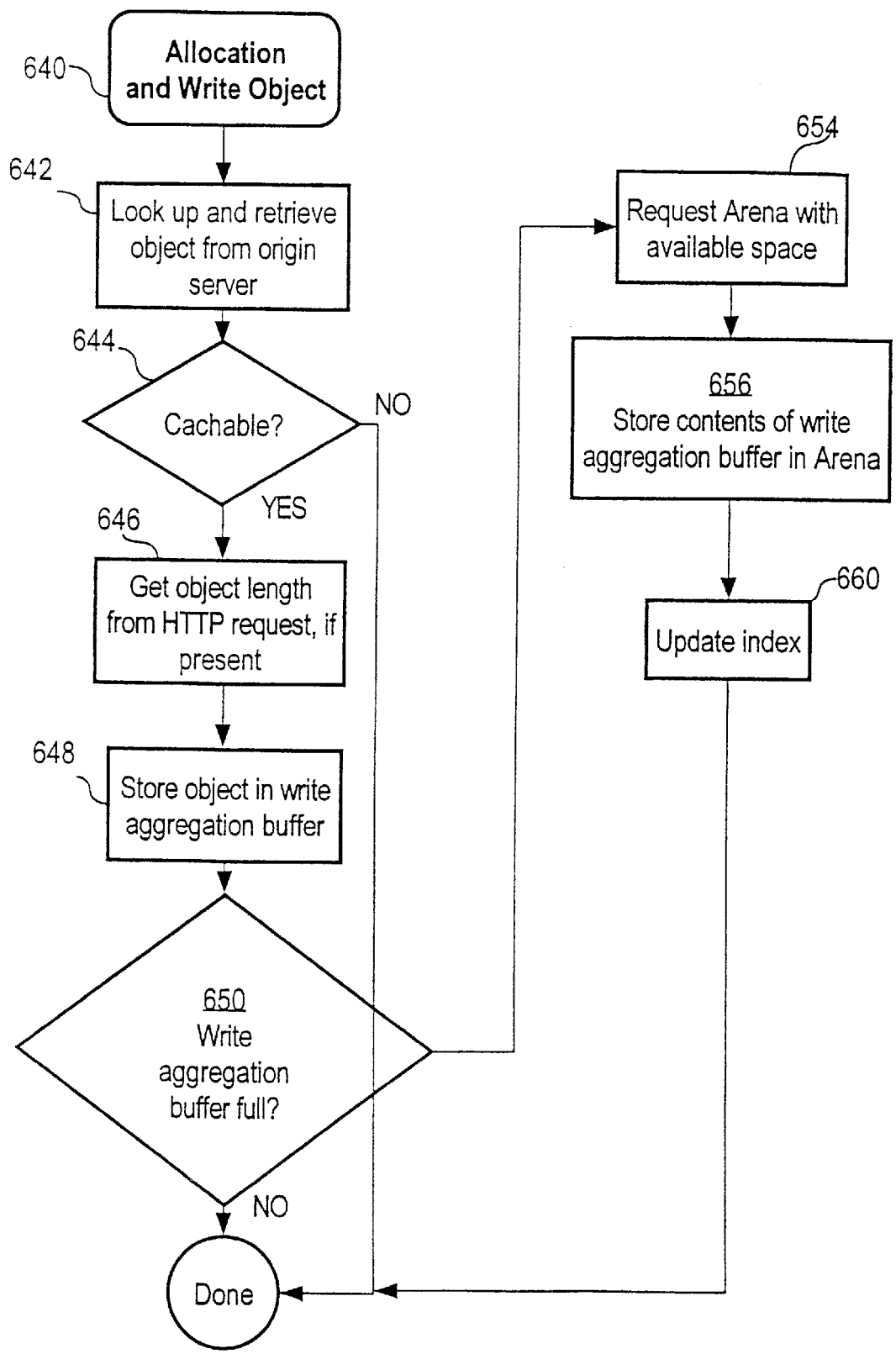
FIG. 10A is a flow diagram of a process of allocating and writing objects in a storage device.

FIG. 10A is a flow diagram of a method of allocating space for objects newly entered into the cache and for writing such objects into the allocated space. The allocation and write method is generally indicated by reference numeral 640. Generally the steps shown in FIG. 10A are carried out when a miss has occurred in the Directory Table and Tag Table, for example, at step 898 of FIG. 8F.

Accordingly, in step 642, an information object that has been requested by a client, but not found in the cache, is looked up and retrieved from its original location. In a networked environment, the origin is a server 40, a cluster, or a disk. When the object is retrieved, in step 644 the method tests whether the object is of the type and size that can be stored in the cache, that is, whether it is "cacheable."

Examples of non-cacheable objects include Web pages that are dynamically generated by a server application, panes or portions of Web pages that are generated by client side applets, objects that are constructed based upon dynamic data taken from a database, and other non-static objects. Such objects cannot be stored in the cache because their form and contents changes each time that they are generated. If such objects were to be stored in the cache, they would be unreliable or incorrect in the event that underlying dynamic data were to change between cache accesses. The process determines whether the object is cacheable by examining information in the HTTP response from the server 40 or other source of the object.

If the object is cacheable, then in step 646 the method obtains the length of the object in bytes. For example, when the invention is applied to the World Wide Web context, the length of a Web page can be included in metadata that is carried in an HTTP transaction. In such a case, the cache extracts the length of the information object from the response information in the HTTP message that contains the information object. If the length is not present, and estimate is generated. Estimates may be incorrect, and will lead to fragmented objects.

As shown in block 648, space is allocated in a memory-resident write aggregation buffer, and the object to be written is streamed into the allocated buffer location. In a preferred embodiment, block 648 involves allocating space in a write aggregation buffer that has sufficient space and is available to hold the object. In block 650, the cache tests whether the write aggregation buffer has remaining free space. If so, the allocation and write process is complete and the cache 80 can carry out other tasks. When the write aggregation buffer becomes full, then the test of block 650 is affirmative, and control is transferred to block 656.

In block 656, the cache writes the aggregation buffer to the arena it is shadowing. In step 660, the Directory is updated to reflect the location of the new information object.

The foregoing sequence of steps is ordered in a way that ensures the integrity of information objects that are written to the cache. For example, the Directory is updated only after a complete information object has been written to an arena, including header and data. For example, if a disk drive or other element of the system crashes before completion of step 652 or step 658, no adverse effect occurs. In such a case, the arena will contain corrupt or incomplete data, but the cache will effectively ignore such data because nothing in the indexes or hash tables is referencing the corrupt data. In addition, using the garbage collection process described herein, the corrupt or incomplete data is eventually reclaimed.

GARBAGE COLLECTION

Figure 8A:
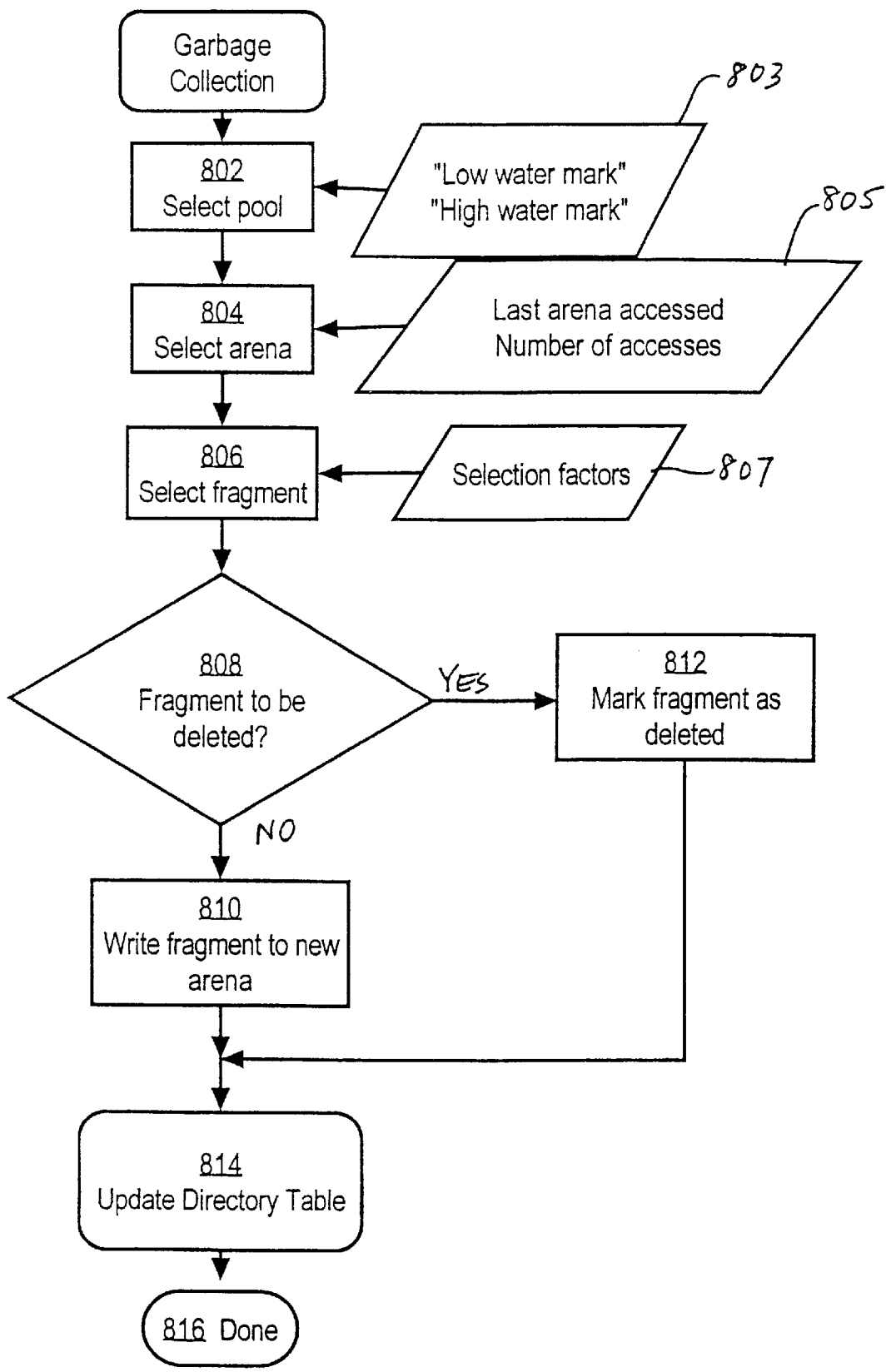
FIG. 8A is a flow diagram of a process of garbage collection.
Figure 8B:
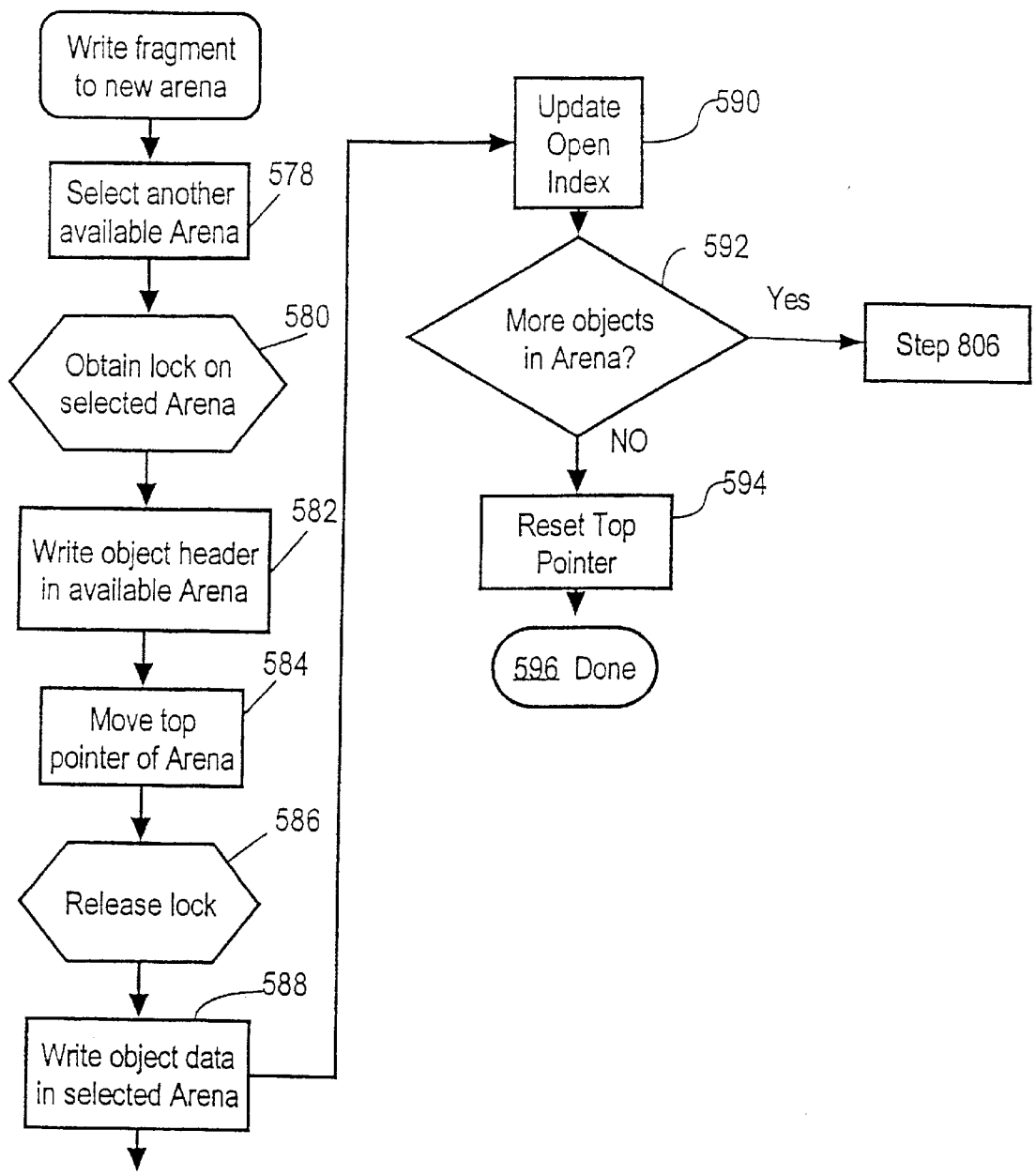
FIG. 8B is a flow diagram of a process of writing information in a storage device.

FIG. 8A is a flow diagram of a method of garbage collection that can be used with the cache 80. FIG. 8B is a flow diagram of further steps in the method of FIG. 8A, and will be discussed in conjunction with FIG. 8A. Preferably, the garbage collection method is implemented as an independent process that runs in parallel with other processes that relate to the cache. This enables the garbage collection method to periodically clean up cache storage areas without interrupting or affecting the operation of the cache.

1. GENERAL PROCESS

In the preferred embodiment, "garbage collection" generally means a process of scanning target arenas, identifying active fragments or determining whether to delete fragments, writing the active fragments contiguously to new arenas, and updating the Directory Table to reference the new locations of the fragments. Thus, in a very broad sense the method is of the "evacuation" type, in which old or unnecessary fragments are deleted and active fragments are written elsewhere, so that at the conclusion of garbage collection operations on a particular arena, the arena is empty. Preferably, both the target arenas and the new arenas are stored and manipulated in volatile memory. When garbage collection is complete, the changes carried out in garbage collection are written to corresponding arenas stored in non-volatile storage such as disk, in a process called synchronization.

In step 802, one of the pools 200a–200n is selected for garbage collection operations. Preferably, for each pool 200a–200n of a storage device 90a, the cache stores or can access a value indicating the amount of disk space in a pool that is currently storing active data. The cache also stores constant "low water mark" and "high water mark" values, as indicated by block 803. When the amount of active storage in a particular pool becomes greater than the "high water mark" value, garbage collection is initiated and carried out repeatedly until the amount of active storage in the pool falls below the "low water mark" value. The "low water mark" value is selected to be greater than zero, and the "high water mark" value is chosen to be approximately 20% less than the total storage capacity of the pool. In this way, garbage collection is carried out at a time before the pool overflows or the capacity of the storage device 90a is exceeded.

2. USAGE-AWARE GARBAGE COLLECTION

In step 804, one of the arenas is selected as a target for carrying out garbage collection. The arena is selected by a selection algorithm that considers various factors. As indicated by block 805, the factors include, for example, whether the arena is the last arena accessed by the cache 80, and the total number of accesses to the arena. In alternate embodiments, the factors may also include the number of information objects that have been deleted from each arena, how recently an arena has been used, how recently garbage collection was previously carried out on each arena, and whether an arena currently has read or write locks set on it. Once the arena is selected for garbage collection, all of the fragments inside the object are separately considered for garbage collection.

In step 806, one of the fragments within the selected arena is selected for garbage collection. In determining which fragment or fragments to select, the cache 80 takes into account several selection factors, as indicated by block 807. In the preferred embodiment, the factors include: the time of the last access to the fragment; the number of hits that have occurred to an object that has data in the fragment; the time required to download data from the fragment to a client; and the size of the object of which the fragment is a part. Other factors are considered in alternate embodiments. Values for these factors are stored in a block 112a–112n that is associated with the object for which the fragment stores data.

In block 808, the cache determines whether a fragment should be deleted. In the preferred embodiment, block 808 involves evaluation of certain performance factors and optimization considerations.

Caches are used for two primary, and potentially conflicting, reasons. The first reason is improving client performance. To improve client performance, it is desirable for a garbage collector to retain objects that minimize server download time. This tends to bias a garbage collector toward caching documents that have been received from slow external servers. The second reason is minimizing server network traffic. To minimize server traffic, it is desirable for a garbage collector to retain objects that are large. Often, these optimizations conflict.

By storing values that identify the time required to download an object, the size of the object, and the number of times the object was hit in cache, the garbage collector can estimate, for each object, how much server download time was avoided and how much server traffic was disabled, by serving the cached copy as opposed to fetching from the original server. This metric measures the inherent "value" of the cached object.

The cache administrator then configures a parameter between 0 and 1, indicating the degree to which the cache should optimize for time savings or for traffic savings. The foregoing values are evaluated with respect to other objects in the arena, with respect to the amount of space the object is consuming, and with respect to objects recently subjected to garbage collection. Based on such evaluation, the cache 80 determines whether to delete the fragment, as shown in step 808.

If the fragment is to be deleted, then in step 812 it is deleted from the arena by marking it as deleted and overwriting the data in the fragment. When an object 52 is stored in multiple fragments, and the garbage collection process determines that one of the fragments is to be deleted, then the process deletes all fragments associated with the object. This may involve following a chain of fragments, of the type shown in FIG. 5, to another arena or even another pool.

If the fragment is not to be deleted, then in step 810 the fragment is written to a new arena. FIG. 8B, which is discussed below, shows preferred sub-steps involved in carrying out step 810.

After the fragment is deleted or moved to another arena, in step 814 the Directory Table 110 is updated to reflect the new location of the fragment. Step 814 involves using the value of the key 206a in the fragment header 208d associated with a fragment 208n to be updated to look up a block 112a–112n that is associated with the fragment. When the correct Directory Table block 112a–112n is identified, the disk location value 118 in the block is updated to reflect the new location of the fragment. If the fragment has been deleted, then any corresponding Directory Table entries are deleted.

Step 816 indicates that the method is complete after the Directory Table 110 is updated. However, it should be understood that the steps of FIG. 8A are carried out for all pools, all arenas within each pool, and all fragments within each arena.

3. WRITING FRAGMENTS TO NEW ARENAS

FIG. 8B is a flow diagram of steps involved in carrying out step 810, namely, writing a fragment that is to be preserved to a new arena. The process of writing evacuated fragments to new arenas is completely analogous to writing original fragments. The data is written into a write aggregation buffer, and dropped to disk arenas when full.

In step 590, the directory tables are updated to reflect the change in location of the fragment. In the preferred embodiment, step 590 involves writing update information in the Open Directory 130 rather than directly into the Directory Table 1110. At a later time, when the process can verify that the fragment data 208e has been successfully written to one of the storage devices 90a–90n, then the changes reflected in the Open Directory 130 are written into or synchronized with the Directory Table 110.

This process is used to ensure that the integrity of the Directory Table 110 is always preserved. As noted above, buffered storage is used for the fragments; thus, when a fragment is updated or a new fragment is written, the fragment data is written to a buffer and then committed to a disk or other storage device at a future time. Thus, during garbage collection, it is possible that a fragment that has been moved to a new arena is not actually written on one of the storage devices when the garbage collection process is ready to update the Directory Table. Therefore, information about the change is stored in the Open Directory 130 until the change is committed to disk.

In step 592, the original arena is examined to test whether it has other fragments that might need to be reclaimed or moved to a new arena. If other objects are present, then control returns to step 806 of FIG. 8A, so that the next object can be processed. If no other objects are present in the current arena, then in step 594, the top pointer of the current arena is reset.

4. BUFFERING

In the preferred embodiment, read and write operations carried out by the cache 80 and the garbage collection process are buffered in two ways.

First, communications between the cache 80 and a client 10a that is requesting an object from the browser are buffered through a flow-controlling, streaming, buffering data structure called a VConnection. In the preferred embodiment, the cache 80 is implemented in a set of computer programs prepared in an object-oriented programming language. In this embodiment, the VConnection is an object declared by one of the programs, and the VConnection encapsulates a buffer in memory. Preferably, the buffer is a FIFO buffer that is 32 Kbytes in size.

When a client 10a–10c connects to the cache 80, the cache assigns the client to a VConnection. Data received from the client 10a is passed to the cache 80 through the VConnection, and when the cache needs to send information to the client 10a, the cache writes the information to the VConnection. The VConnection regulates the flow of data from the cache 80 to match the data transmission speed used by the client 10a to communicate with the cache. In this way, use of the VConnection avoids an unnecessary waste of main memory storage. Such waste would arise if an object being sent to the client 10a was copied to memory in its entirety, and then sent to the client; during transmission to a slow client, main memory would be tied up unnecessarily. Buffered I/O using these mechanisms tends to reduce the number of sequential read and write operations that are carried out on a disk.

5. SYNCHRONIZATION AND CONSISTENCY ENFORCEMENT

Regularly during the garbage collection process and during operation of the cache 80, a synchronization process is carried out. The synchronization process commits changes reflected in the Open Directory 130 to the Directory Table 110 and to stable storage, such as non-volatile storage in one or more of the storage devices 90a–90n. The goal is to maintain the consistency of the data on disk at all times. That is, at any given instant the state of the data structures on disk is 100% consistent and the cache can start up without requiring checking. This is accomplished through careful ordering of the writing and synchronization of data and meta-data to the disk.

For the purposes of discussion, in this section, 'data' refers to the actual objects the cache is being asked to store. For instance, if the cache is storing an HTML document, the data is the document itself. 'Meta-data' refers to the additional information the cache needs to store in order to index the 'data' so that it can be found during a subsequent lookup( ) operation as well as the information it needs to allocate space for the 'data'. The 'meta-data' is comprises the directory and the pool headers. The directory is the index the cache uses for associating a key (a name) with a particular location on disk (the data). The cache uses the pool headers to keep track of what disk space has been allocated within the cache.

The cache uses two rules to maintain the consistency of the data structures on disk. The first rule is that meta-data is always written down after the data it points to. The rationale for the first rule is that the cache has no "permanent" knowledge of an object being in the cache until the meta-data is written. If the cache were to write down the meta-data before the data and then crash, the meta-data would associate an object name with invalid object data on disk. This is undesirable, since the cache would then have to use heuristics to try and determine which meta-data points to good data and which points to bad.

The second rule is that a pool arena cannot be marked as empty in the pool header until all the directory meta-data that points to the arena has been deleted and written to disk. This is necessary so that a crash cannot cause an empty arena to exist for which directory meta-data points to it. The problem this can cause is that the empty arena can become filled with new data, since it is empty and therefore it is available for new data to be written into it. However, "old" directory meta-data points to the same location as the new data. It is possible for accesses to the old directory meta-data to return the new data instead of either returning the old data or failing.

Figure 8C:
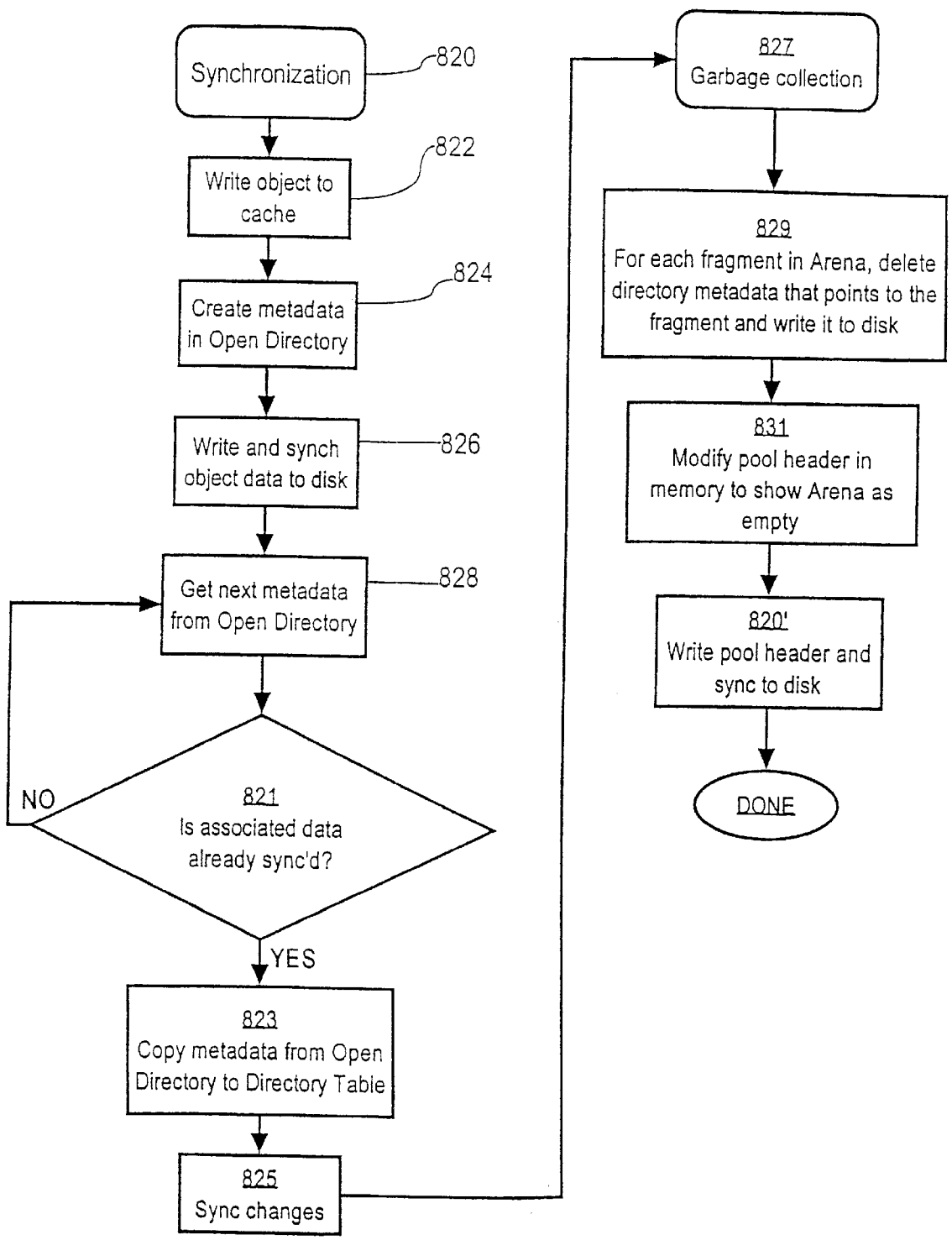
FIG. 8C is a flow diagram of a process of synchronization.

FIG. 8C is a flow diagram of a preferred synchronization method 820 that implements the foregoing two rules. In block 822, an object is written to the cache. Block 822 involves the steps of block 824 and block 826, namely, creating metadata in the Open Directory, and writing and syncing the object data to disk.

The steps of blocks 828 through 820' are carried out periodically. As indicated in block 828, for each piece of meta-data in the open directory table, a determination is made whether the data that the metadata points to is already synchronized to disk, as shown in block 821. If so, then in block 823, the cache copies the metadata that points to the stable data from the Open Directory to the Directory Table. In block 825, the changes are synchronized to disk.

In block 827, garbage collection is carried out on an arena. Block 827 may involve the steps shown in FIG. 8A. Alternatively, garbage collection generally involves the steps shown in block 829, block 831, and block 820'. As shown in block 829, for each fragment in the arena, the cache deletes the directory metadata that points to the segment, and writes the directory metadata to disk. In block 831, the pool header is modified in memory such that the arena is marked as empty. In block 820', the pool header is written and synced to disk.

The steps that involve writing information to disk preferably use a "flush" operation provided in the operating system of the workstation that is running the cache 80. The "flush" operation writes any data in the buffers that are used to store object data to a non-volatile storage device 90a–90c.

Using the foregoing methods, the Directory Table is not updated with the changes in the Open Directory until the data that the changes describe is actually written to disk or other non-volatile storage. Also, the cache 80 postpones updating the arenas on disk until the changes undertaken by the garbage collection process are committed to disk. This ensures that the arenas continue to store valid data in the event that a system crash occurs before the Directory Table is updated from the Open Directory.

6. RE-VALIDATION

In the preferred embodiment, the cache provides a way to re-validate old information objects in the cache so that they are not destroyed in the garbage collection process.

Figure 12:
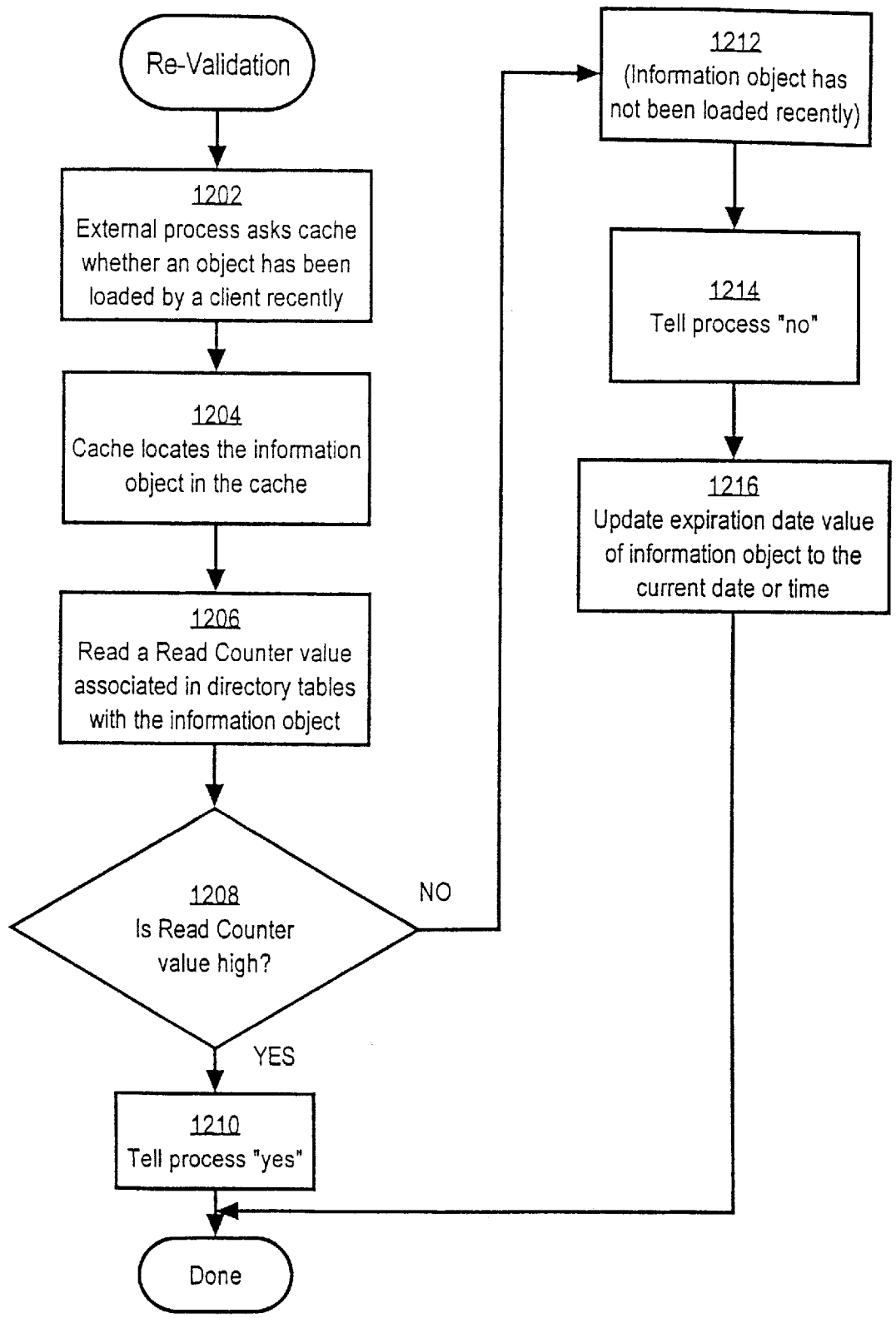
FIG. 12 is a flow diagram of a process of object re-validation.

FIG. 12 is a flow diagram of a preferred re-validation process. In block 1202, an external program or process delivers a request to the cache that asks whether a particular information object has been loaded by a client recently. In response to the request, as shown in block 1204, the cache locates the information object in the cache. In block 1206, the cache reads a Read Counter value associated in the directory tables with the information object. In block 1208, the cache tests whether the Read Counter value is high.

If the Read Counter value is high, then the information object has been loaded recently. In that case, in block 1210 the cache sends a positive response message to the requesting process. Otherwise, as indicated in block 1212, the information object has not been loaded recently. Accordingly, as shown in block 1214, the cache sends a negative responsive message to the calling program or process. In block 1216, the cache updates an expiration date value stored in association with the information object to reflect the current date or time. By updating the expiration date, the cache ensures that the garbage collection process will not delete the object, because after the update it is not considered old. In this way, an old object is refreshed in the cache without retrieving the object from its origin, writing it in the cache, and deleting a stale copy of the object.

SCALED COUNTER UPDATING

Figure 10B:
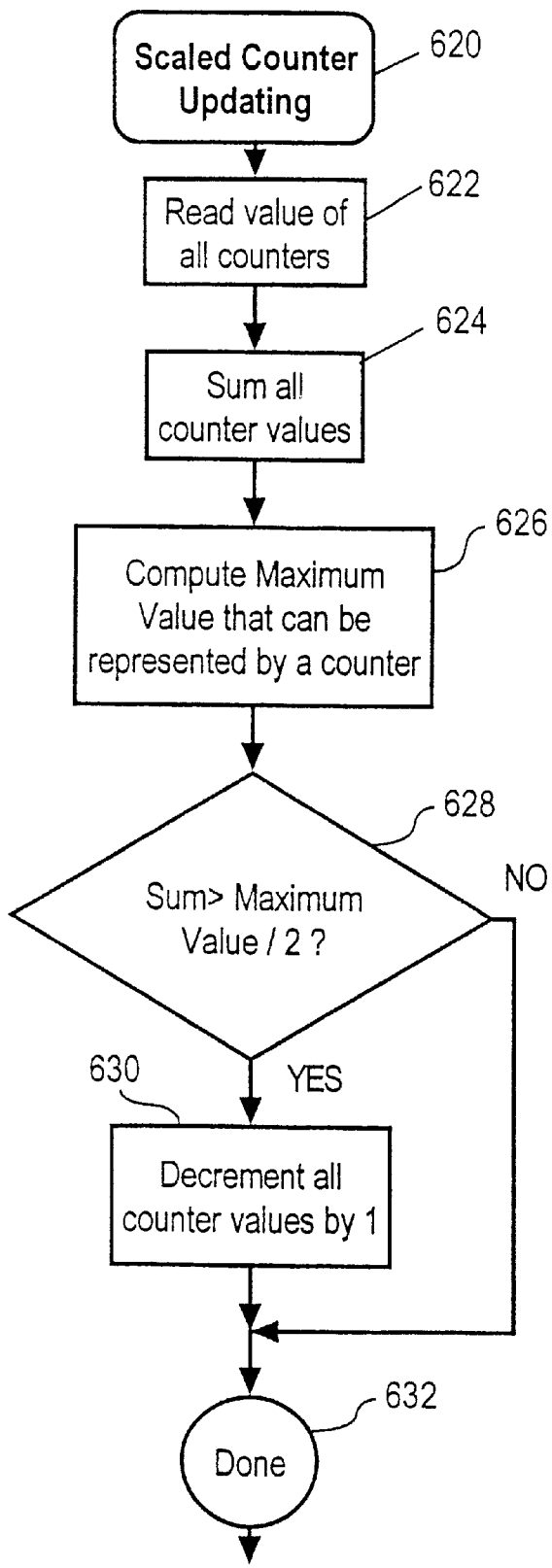
FIG. 10B is a flow diagram of a process of scaled counter updating.

FIG. 10B is a flow diagram of a method of scaled counter updating. In the preferred embodiment, the method of FIG. 10B is used to manage the Read Counter values that are stored in each block 112a–112n of a set of the Directory Table, as shown in FIG. 3A. However, the method of FIG. 10B is not limited to that context. The method of FIG. 10B is applicable to any application that involves management of each of a plurality of objects that has a counter, and in which it is desirable to track the most recently used or least recently used objects. A key advantage of the method of FIG. 10B in comparison to past approaches is that it enables large counter values to be tracked in a small storage area.

In the preferred embodiment, each of the Read Counter values stored in blocks 112a–112n is stored in three bit quantities. During operation of the cache 80, when a block is accessed, the Read Counter value of the block is incremented by one. The highest decimal number that can be represented by a three-bit quantity is 7. Accordingly, a Read Counter could overflow after being incremented seven times. To prevent counter overflow, while enabling the counters to track an unlimited number of operations that increment them, the method of FIG. 10B is periodically executed.

The following discussion of the steps of FIG. 10B will be more clearly understood with reference to Table 1:

TABLE 1

SUCCESSIVE COUNTER VALUES

| | COUNTERS | | |
|---|---|---|---|
| EVENT | A | B | C |
| 1: Start | 1 | 1 | 1 |
| 2: Increment | 2 | 1 | 1 |
| 3: Increment | 7 | 3 | 1 |
| 4: Decrement | 6 | 2 | 0 |
| 5: Reclaim | 6 | 2 | — |

In Table 1, the EVENT column identifies successive events affecting a set of counter values, and briefly indicates the nature of the event. The COUNTERS heading indicates three counter values A, B, and C represented in separate columns. Each of the counter values A, B, C corresponds to a counter value that is stored in a different block 112a–112n of the Directory Index 110. Thus, each row of Table 1 indicates the contents of three counter values at successive snapshots in time.

Event 1 of Table 1 represents an arbitrary starting point in time, in which the hash table entries containing the counter values A, B, C each have been accessed once. Accordingly, the value of each counter A, B, C is one. At event 2, the cache has accessed the hash table entry that stores counter value A. Accordingly, counter A has been incremented and its value is 2; the other counters B, C are unchanged. Assume that several other hash table entry accesses then occur, each of which causes one of counters A, B, or C to be incremented. Thereafter, at event 3, the values of the counters A, B, C are 7, 3, and 1 respectively. Thus, counter A is storing the maximum value it can represent, binary 111 or decimal 7, and will overflow if an attempt is made to increment it to a value greater than 7.

At this point, the method of FIG. 10B is applied to the counters A, B, C. In step 622, the value of all the counters is read. In step 624, the sum of all the counter values is taken. In the case of Table 1, the sum is given by 7+3+1=11. In step 626, the maximum sum that can be represented by all the counters is computed based upon the length in bits of the counter values. In the case of a three-bit value, the maximum value of one counter is 7 and the maximum value for the sum of three three-bit counters is 7×3=21. Alternatively, step 626 can be omitted; the maximum value can be stored as a constant that is available to the scaled counter method 620 and simply retrieved when needed.

In step 628, the method computes the value (maximum_value/2), truncating any remainder or decimal portion, and compares it to the sum of all the counters. In the example above, the relationship is Sum=11
Maximum_Value=21
Maximum_Value/2=10
(Sum>Maximum_Value/2)=TRUE Since the result is true, control is transferred to step 630, in which all the counter values are decremented by 1. The state of counters A, B, C after this step is shown by Event 4, "Decrement." Note that counter C, which represents the least recently used hash table entry, has been decremented to zero. At this point, least recently used hash table entries can be reclaimed or eliminated by scanning the corresponding counter values and searching for zero values. The result of this step is indicated in Event 5 of Table 1, "Reclaim." The values of counters A and B are unchanged, and the value of counter C is undefined because its corresponding hash table entry has been deleted from the hash table.

When the method of FIG. 10B is repeated periodically and regularly, none of the plurality of counter values will overflow. Also, least recently used entries are rapidly identified by a counter value of zero, and can be easily eliminated from the cache. Counter values can be maintained in few bits even when hash table entries are accessed millions of times. Thus, the method of FIG. 10B provides a fast, efficient way to eliminate least recently used entries from a list.

CACHE OPERATIONS

In the preferred embodiment, the cache 80 is implemented in one or more computer programs that are accessible to external programs through an API that supports read and write operations. The read and write operations are carried out on the Open Directory 130, which is the only structure of the cache 80 that is "visible" to external programs or processes. The read operation is invoked by an external program that wants to locate an object in the cache. The write operation is invoked by a program that wants to store an object in the cache. Within the programs that make up the cache 80, operations called lookup, remove, checkout, and checkin are supported. The lookup operation looks up an object in the Open Directory based upon a key. The remove operation removes an object from the Open Directory based upon a key. The checkout operation obtains a copy of a block from the Directory Table 110 in an orderly manner so as to ensure data consistency. The checkin operation returns a copy of a block (which may have been modified in other operations) to the Directory Table 110. In other embodiments, a single cache lookup operation combines aspects of these operations.

1. LOOKUP

Figure 9A:
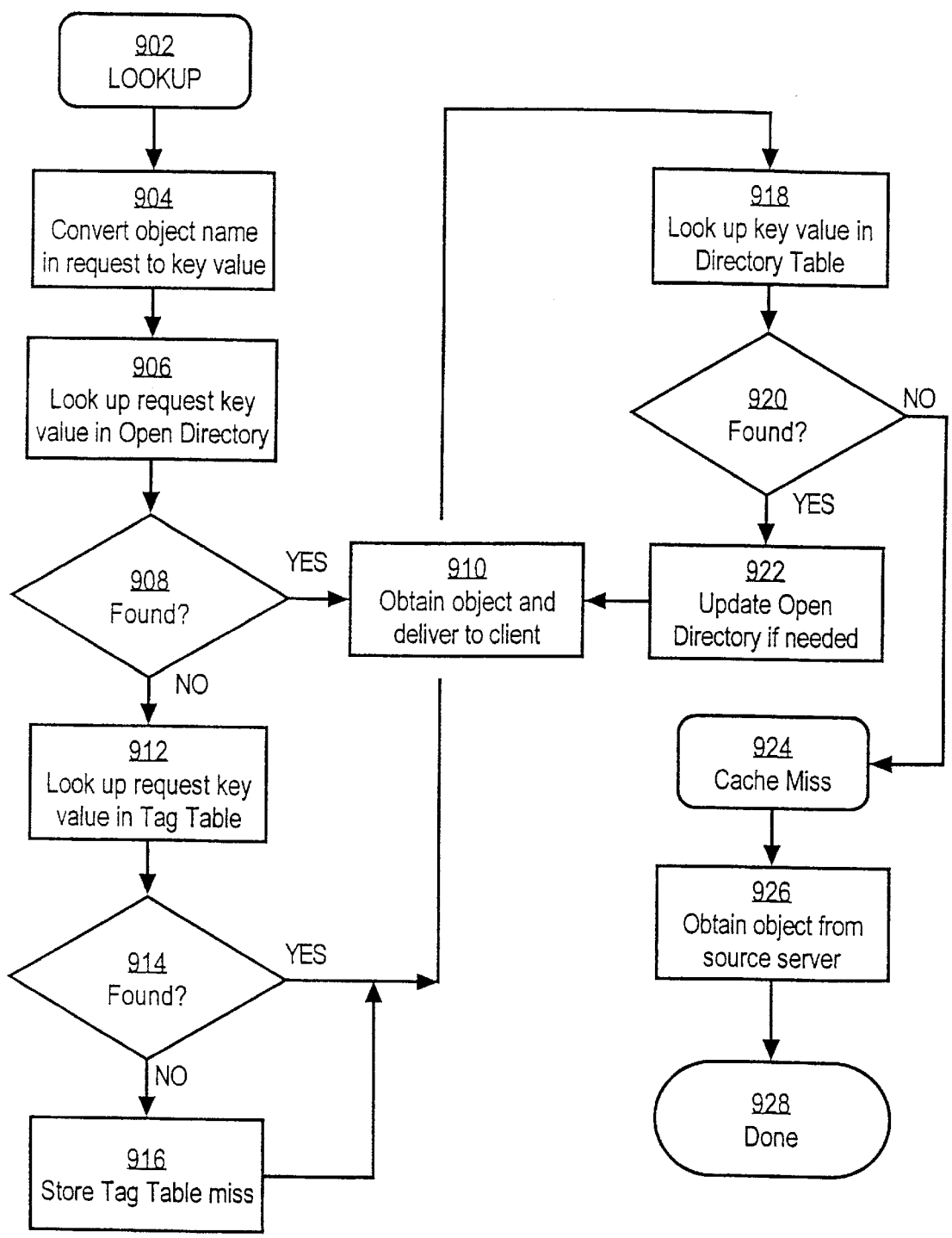
FIG. 9A is a flow diagram of a cache lookup process.

In an alternate embodiment, a LOOKUP operation is used to determine whether a particular object identified by a particular name is currently stored in the cache 80. FIG. 9A is a flow diagram of steps carried out in one embodiment of the LOOKUP operation, which is generally designated by reference numeral 902. The LOOKUP operation is initiated by a command from the protocol engine 70 to the cache 80 when a request message from a client 10a seeks to retrieve a particular object from the server 40. The request message from the client 10a identifies the requested object by its name.

When the process is applied in the context of the World Wide Web, the name is a Uniform Resource Locator (URL). In step 904, the cache 80 converts the name of the object to a key value. In the preferred embodiment, the conversion step is carried out as shown in FIG. 3B. The object name 53 or URL is passed to a hash function, such as the MD5 one-way has function. The output of the hash function is an object name key 62. The object name key 62 can be broken up into one or more subkey values 64, 66.

In step 906, the cache 80 looks up the request key value in the Open Directory 130. The Open Directory is consulted first because it is expected to store the most recently requested objects and therefore is likely to contain the object in the client request. Preferably, step 906 involves using one of the subkey values as a lookup key. For example, a 17-bit or 18-bit subkey value can be used for the lookup.

In step 908, the cache 80 tests whether the subkey value has been found in the Open Directory. If the subkey value has been found in the Open Directory, then in step 910 the cache 80 retrieves the object from one of the storage devices, and delivers the object to the client. The retrieval sub-step involves the sub-steps described above in connection with locating objects in pools, arenas, and fragments of non-volatile storage in the storage devices 90a–90c. The delivery sub-step involves constructing an HTTP response to the client that includes data of the object, opening an HTTP connection to the client, and sending the HTTP request to the client.

If the subkey value is not found in the Open Directory, then in step 912, the cache 80 looks up the request subkey value in the Tag Table 102. In step 914, the cache 80 tests whether the subkey value was found in the Tag Table 102. If no match was found, then in step 916 the cache 80 stores information about the fact that no match occurred, for later use as described below. The information can be a bit indicating that a miss in the Tag Table 102 occurred.

In step 918, the cache 80 looks up the subkey value in the Directory Table. If the test of step 914 was affirmative, then the cache 80 retrieves a subkey value matching the request subkey value from one of the entries 106 of the tag Table 102. Its value is used as a key to look up the request key value in the Directory Table. In step 920, the cache 80 tests whether the request key value was found in the Directory Table. If a hit occurs, and there was a miss in the Tag Table as indicated by the information stored in step 916, then in step 922 the cache 80 updates the Open Directory with information related to the Directory Table hit. Control is then passed to step 910 in which the object is obtained and delivered to the client in the manner described above.

If the test of step 920 is negative, then the requested object is not in the cache, and a cache miss condition occurs, as indicated in step 924. In response to the miss condition, in step 926 the cache 80 obtains a copy of the requested object from the server that is its source. For example, in the Web context, the cache 80 opens an HTTP connection to the URL provided in the client's request, and downloads the object. The object is then provided to the client and stored in the cache for future reference.

In a preferred embodiment, the LOOKUP operation is implemented as a method of an object in an object-oriented programming language that receives a key value as a parameter.

2. CACHE OPEN READ PROCESS

Figure 9B:
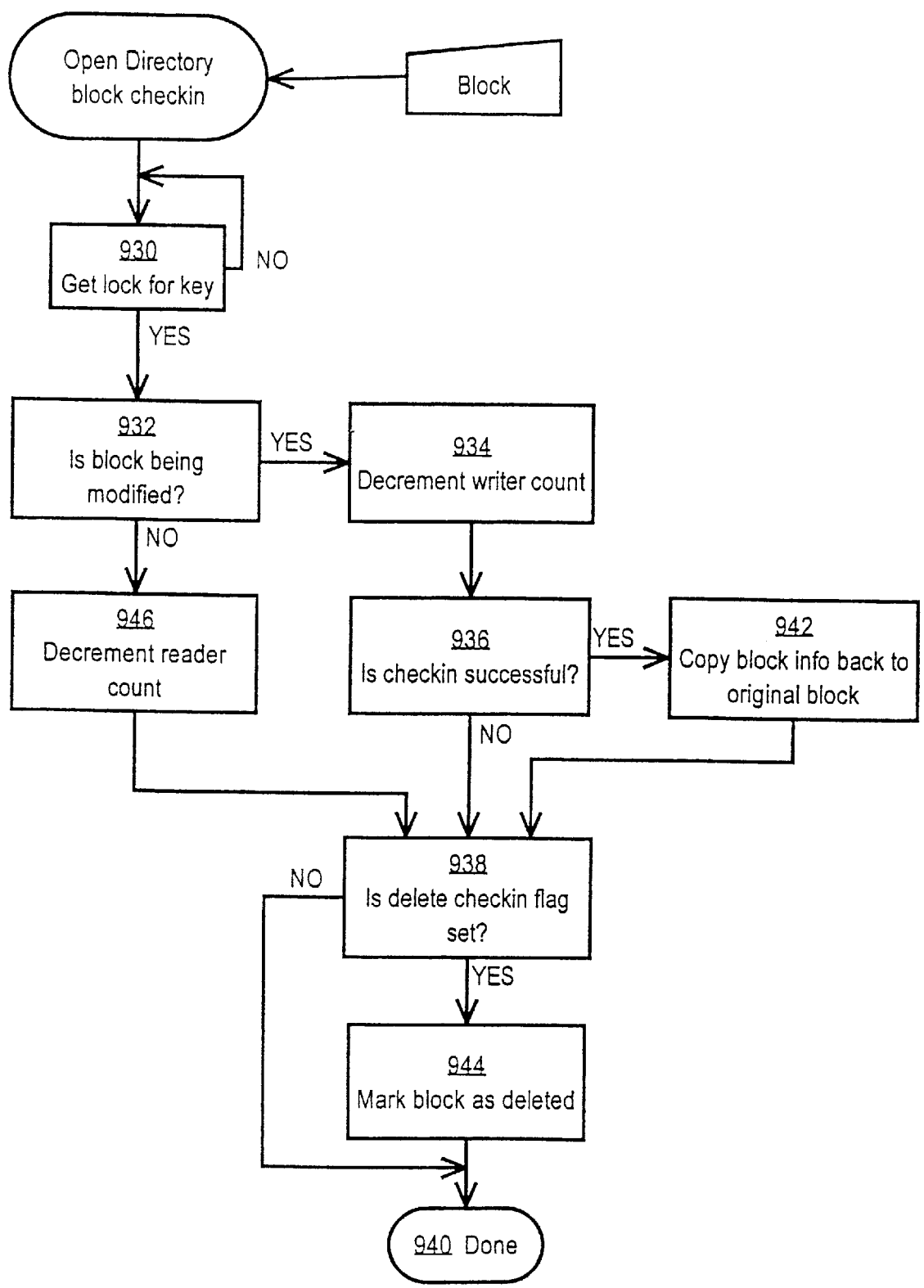
FIG. 9B is a flow diagram of a "checkin" process.
Figure 9C:
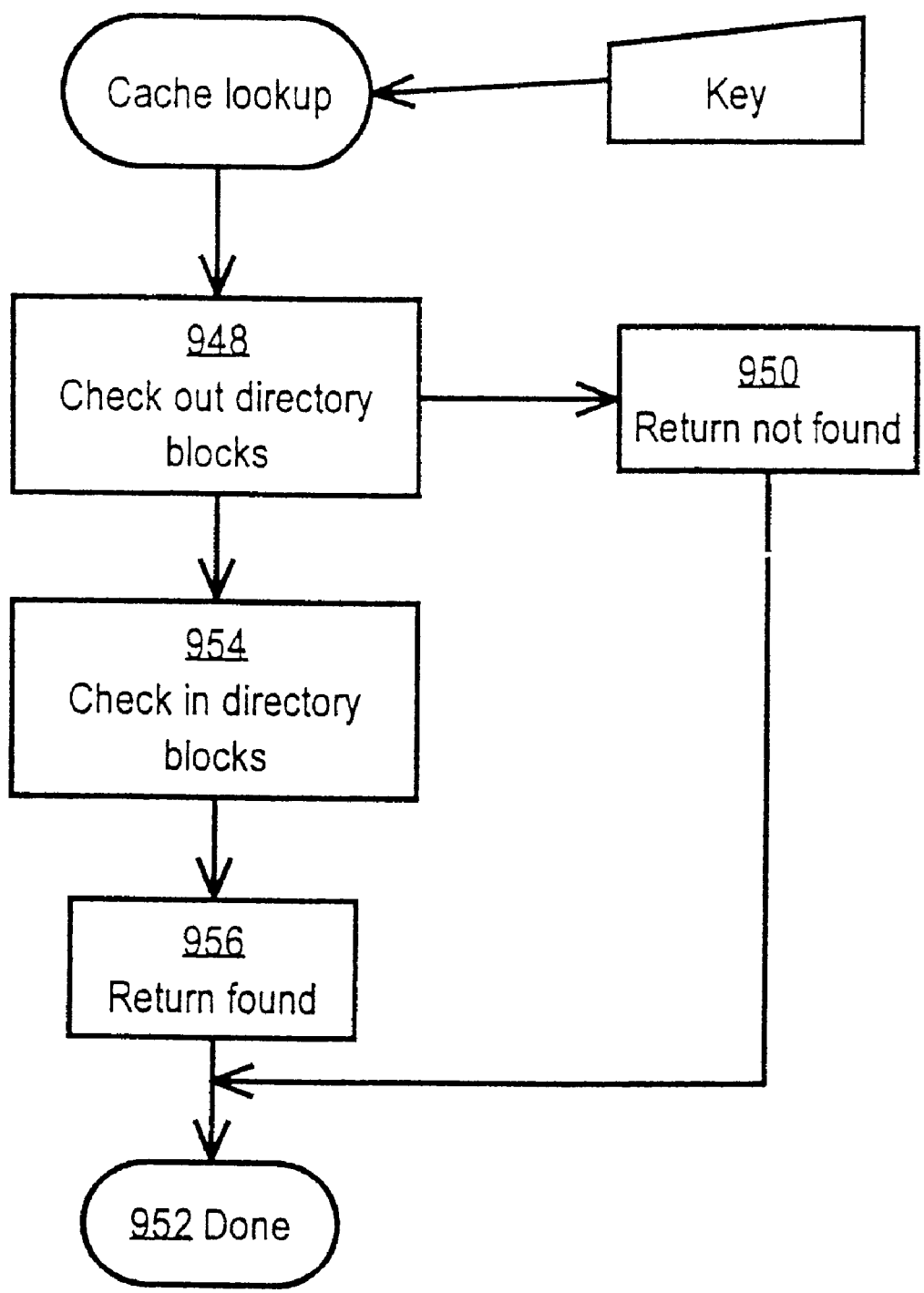
FIG. 9C is a flow diagram of a cache lookup process.
Figure 9D:
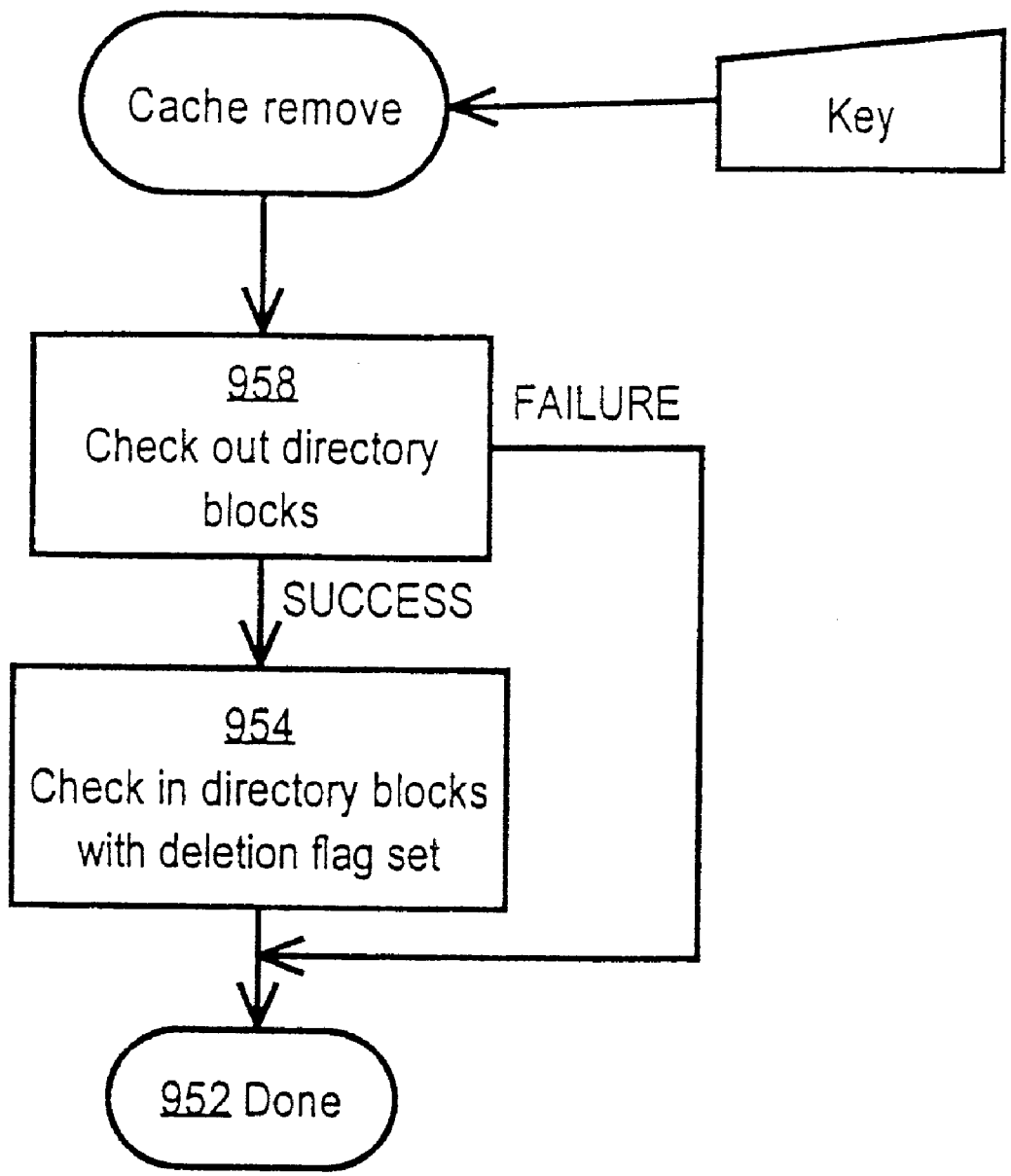
FIG. 9D is a flow diagram of a cache remove process.
Figure 9E:
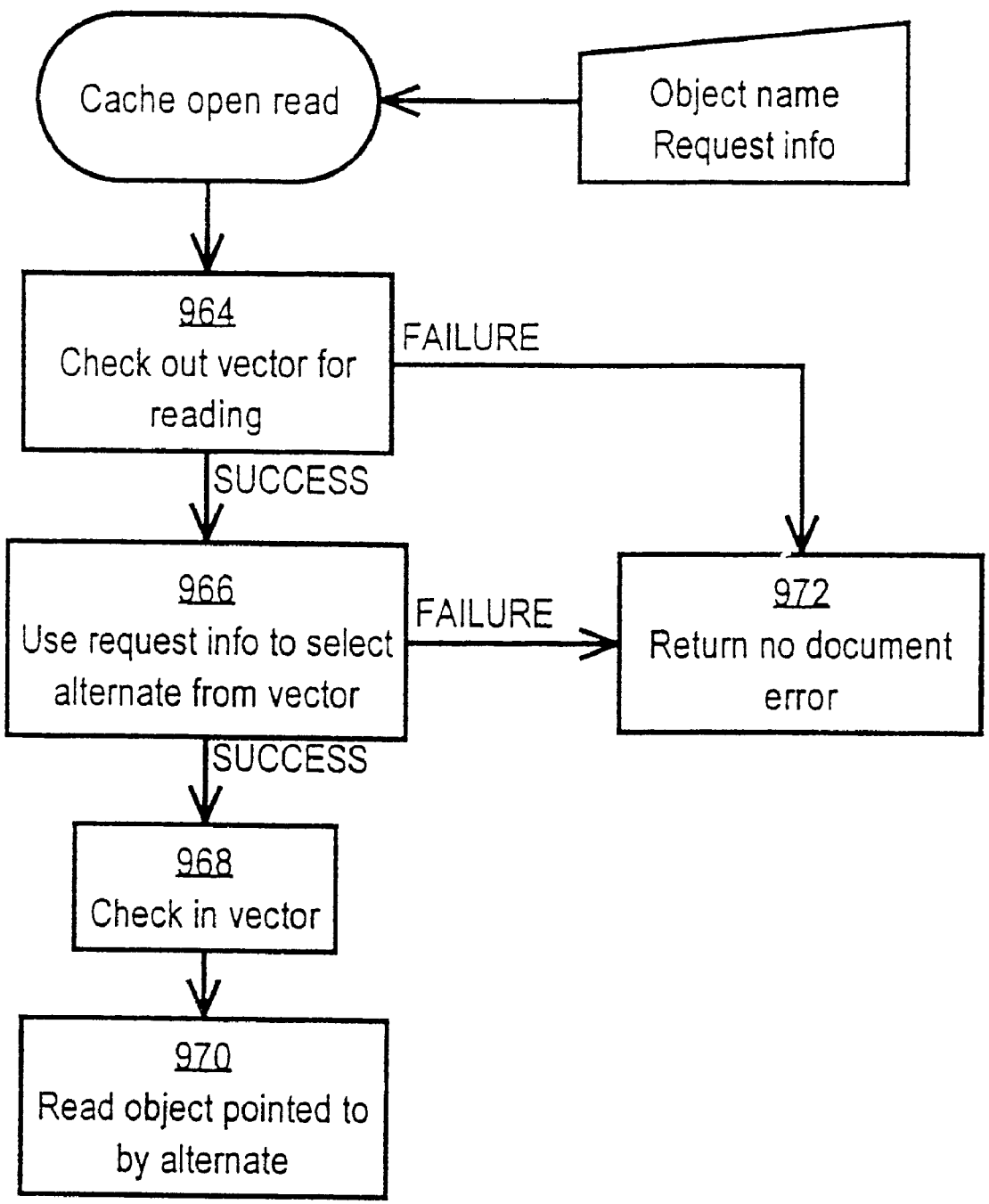
FIG. 9E is a flow diagram of a cache read process.

FIG. 9E is a flow diagram of a preferred process of reading an object that is identified by an object name (such as a URL) from the cache. In the preferred embodiment, the process of FIG. 9E is called "open_read," and represents the sole external interface of the cache 80. It is advantageous, to ensure control and consistency of data in the cache, to enable external programs to access only operations that use or modify the Open Directory 130. Preferably, the process of FIG. 9E is implemented as a program or programmatic object that receives an object name, and information about the user's particular request, as input parameters. The read process returns a copy of an object associated with a key that is found in the cache using the lookup process. Thus, the read process, and other processes that are invoked or called by it, are an alternative to the LOOKUP operation described above in connection with FIG. 9A.

In step 964, the process checks out a Vector of Alternates so that alternates in the vector can be read. Preferably, step 964 involves invoking the checkout_read process described herein in connection with FIG. 8D, providing a key derived from the object name as a parameter. Checking out a vector involves checking out a block from the Open Directory that has a pointer to the vector, and reaching the block from the cache.

If the checkout operation is successful, then in step 966 the process uses the request information to select one of the alternates from among the alternates in the vector. This selection is carried out in the manner described above in connection with the Vector of Alternates 122. In an embodiment, the selection operation is carried out by another program or programmatic object that returns a success/failure indication depending upon whether a suitable alternate is located. If the selection is successful, then in step 968 the process checks the Vector of Alternates back in. In step 970, the process reads the object that is pointed to by the selected alternate.

If step 964 or step 966 results in failure, then the requested document does not exist in the cache. Accordingly, in step 972 the process returns a "no document" error message to the calling program or process.

3. CACHE OPEN WRITE PROCESS

FIG. 9F is a flow diagram of a process of writing an object into the cache. As in the case of the read process described above in connection with FIG. 9E, the write process preferably is implemented as an "open write" method that is the sole interface of the cache 80 to external programs needing to store objects in the cache. Preferably, the process of FIG. 9F is implemented as a program or method that receives an object name, request information, and response information as input parameters. The object name identifies an object to be written into the cache; in the preferred embodiment, the object name is a name key 62 derived from a URL using the mechanism shown in FIG. 3B.

The write process is initiated when a client 10a has requested an object 52 from the cache 80 that is not found in the cache. As a result, the cache 80 opens an HTTP transaction with the server 40 that stores the object, and obtains a copy of the object from it. The request information that is provided to the cache write process is derived from the HTTP request that came from the client. The response information is derived from the response of the server 40 to the cache 80 that supplies the copy of the object.

In step 974, the process checks out a Vector of Alternates. This step involves computing a key value based upon the object name, looking up a set and a block in the Open Directory that map to the key value, and locating a Vector of Alternates, if any, that corresponds to the block. If no vector exists, as shown in step 984, a new vector is created If a vector is successfully checked out or created, then in step 976 the process uses the request information to define a new alternate record 123a–123n within the current alternate. The new alternate record references the location of the object, and contains a copy of the request information and the response information. The new alternate is added to the Vector of Alternates. Duplicate alternate records are permitted; the Vector of Alternates can contain more than one alternate record that contains the same request and response information. Testing existing alternate records to identify duplicates is considered unnecessary because only a small incremental amount of storage is occupied by duplicate alternate records.

In step 978, the modified vector is checked into the cache using the steps described above. In step 980, the object is written to one of the data storage devices 90a–90c in the manner described above, using the key value. If the key is found to be in use during step 980, then the write operation fails. This avoids overwriting an object identified by a key that is being updated.

4. CACHE UPDATE PROCESS

Figure 9G:
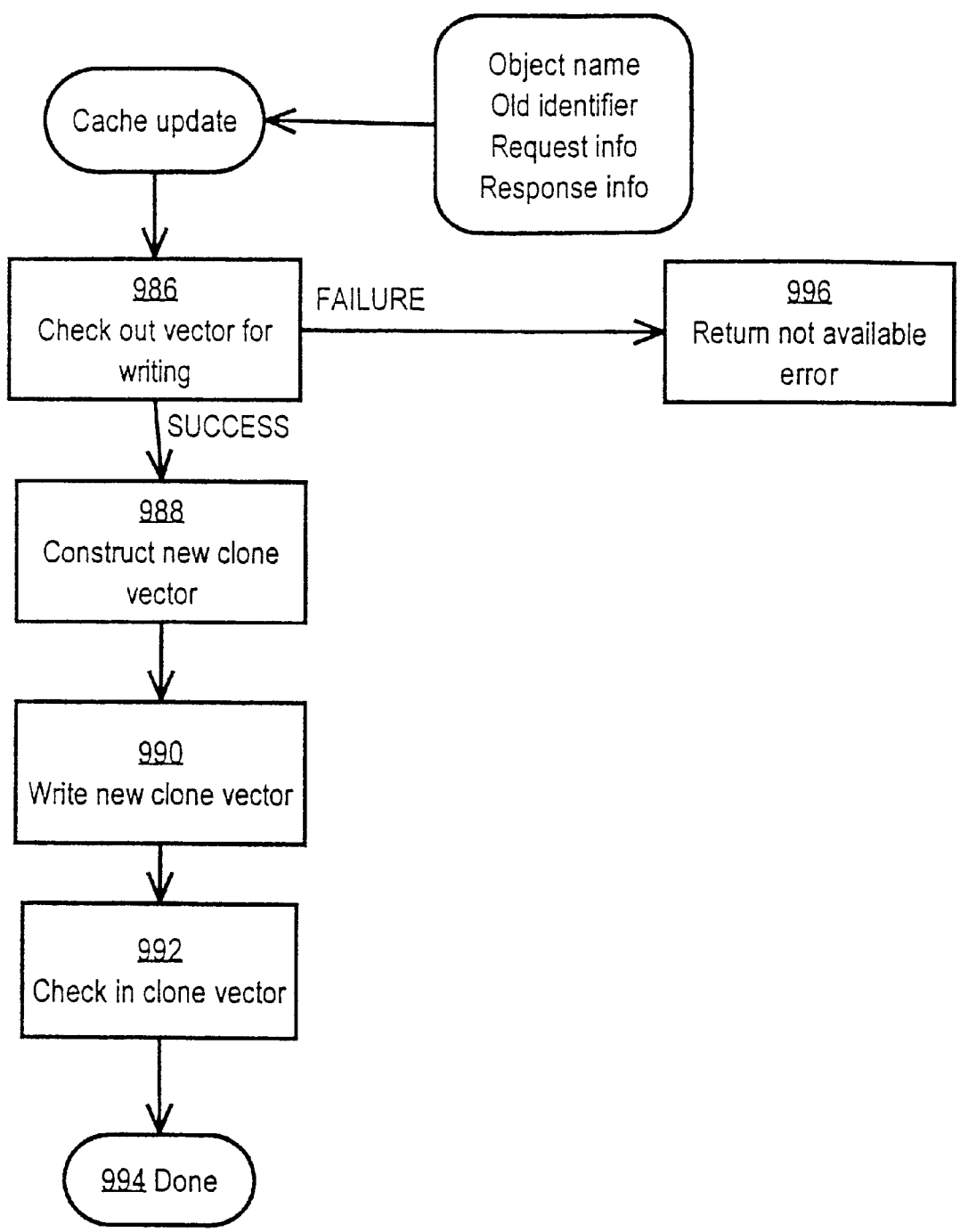
FIG. 9G is a flow diagram of a cache update process.

FIG. 9G is a flow diagram of a cache update process. The update process is used to modify a Vector of Alternates to store different request information or response information. Generally, the update process is invoked by the protocol engine 70 when the cache 80 is currently storing an object 52 that matches a request from a client 10a, but the protocol engine determines that the object has expired or is no longer valid. Under these circumstances, the protocol engine 70 opens an HTTP transaction to the server 40 that provided the original object 52, and sends a message that asks the server whether the object has changed on the server. This process is called "revalidation" of the object 52. If the server 40 responds in the negative, the server will provide a short HTTP message with a header indicating that no change has occurred, and providing new response information. In that case, the protocol engine 70 invokes the cache update process in order to move the new response information about the object 52 into the cache 80.

If the server 40 responds affirmatively that the object 52 has changed since its expiration date or time in the cache 80, then the update process is not invoked. Instead, the server 40 returns a copy of the updated object 52 along with a new expiration date and other response information. In that case, the protocol engine 70 invokes the cache write process and the create processes described above to add the new object 52 to the cache 80.

As shown in FIG. 9G, the update process receives input parameters including an object name, an "old" identifier, request information, and response information. The object name is a URL or a key derived from a URL. The request information and response information are derived from the client's HTTP request for the object 52 from the cache 80, and from the response of the server 40 when the cache obtains an updated copy of the object from the cache.

The "old" identifier is a value that uniquely identifies a pair of request information and response information. In the preferred embodiment, when a cache miss causes the cache 80 to write a new object into the cache, information from the client request is paired with response information from the server that provides a copy of the object. Each pair is given a unique identifier value.

In step 986, the process checks out a Vector of Alternates corresponding to the object name from the cache. Preferably, this is accomplished by invoking the checkout_write process described herein. This involves using the object name or URL to look up an object in the Open Directory, the Tag Table, and the Directory Index, so that a corresponding Vector of Alternates is obtained. If the checkout step fails, then in step 996 the process returns an appropriate error message.

If the checkout is successful, then in step 988 a copy or clone of the vector is created in main memory. A request/response identifier value is located within the vector by matching it to the Old Identifier value received as input to the process. The old identifier value is removed and a new identifier is written in its place. The new identifier uniquely identifies the new request and response information that is provided to the process as input.

In step 990, the new vector is written to one of the storage devices 90a–90c, and in step 992 the new vector is checked in to the cache. In carrying out these steps, it is desirable to completely write the clone vector to the storage device before the vector is checked in. This ensures that the writing operation is successful before the directory tables are modified to reference the clone vector. It also ensures that the old vector is available to any process or program that needs to access it.

5. DIRECTORY LOOKUP

FIG. 9C is a flow diagram of a preferred embodiment of a process of looking up information in the Open Directory 130. The process of FIG. 9C is implemented as a program process or method that receives a subkey portion of a name key 62 as an input parameter. In preceding steps that are not shown, it will be understood that the protocol engine 70 receives an object name, such as a URL. For example, a URL is provided in an HTTP request issued by a client to a server that is operating the cache. The protocol engine 70 applies a hash function to the object name. The hash function yields, as its result or output, a name key that identifies a set in the cache.

In step 948, the process attempts to check out one or more blocks that are identified by the subkey from the Directory Index. The block checkout step preferably involves invoking the checkout_read process described herein. Thus, If the checkout attempt results in a failure state, then in step 950 the process returns an error message to the program or process that called it, indicating that a block matching the input subkey was not found in the cache. Control is passed to step 952 in which the process concludes.

If the checkout attempt is successful, then a copy of a block becomes available for use by the calling program. In step 954, the block that was checked out is checked in again. In step 956, the process returns a message to the calling program indicating that the requested block was found. Processing concludes at step 952.

Thus, a cache search operation involves calling more primitive processes that seek to check out a block identified by a key from the Open Directory. If the primitives do not find the block in the Open Directory, the Directory Index is searched.

When a block is found, it is delivered to the client. For example, when the invention is applied to the World Wide Web context, the data block is delivered by opening an HTTP connection to the client and transmitting the data block to the client using an HTTP transaction. This step may involve buffering several data blocks before the transaction is opened.

6. CACHE REMOVE PROCESS

FIG. 9D is a flow diagram of a process of removing a block relating to an object from the cache. As in the case of the checkout operations, the cache remove process receives a key value as input. The process comprises steps 958 to 962. These steps carry out operations that are substantially similar to the operations of steps 948, 954, and 952 of FIG. 9C. To accomplish removal of a block found in the cache, however, in step 960 the process sets the deletion flag, and checks the block in with the deletion flag set. As described herein in connection with the check-in process (steps 938 and 944 of FIG. 9B), when the deletion flag is set, the block will be marked as deleted. Thereafter, the block is eventually removed from the Directory Index when the changes reflected in the Open Directory are synchronized to the Directory Index.

7. CHECKOUT READ OPERATION

Figure 8D:
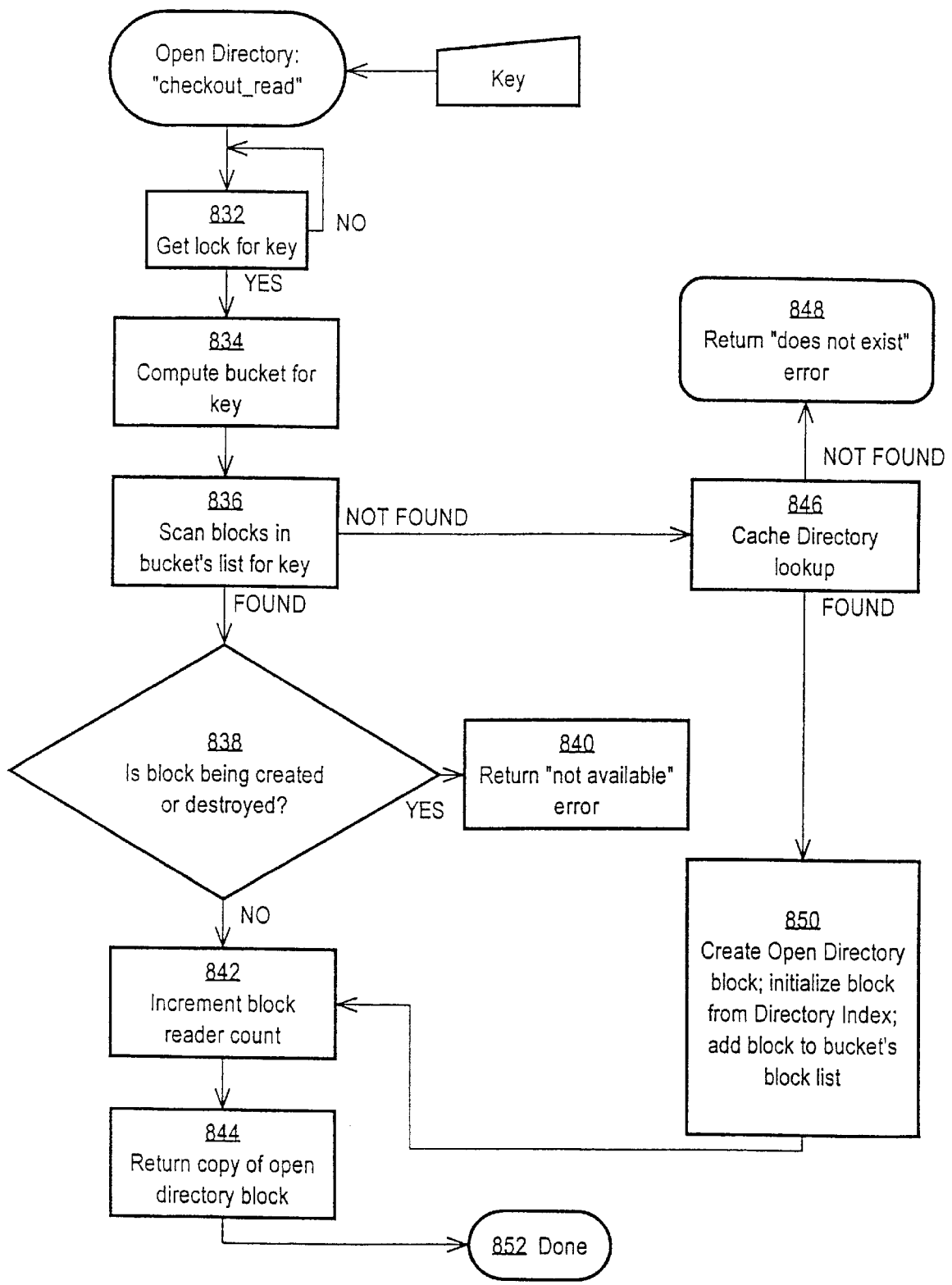
FIG. 8D is a flow diagram of a "checkout_read" process.

FIG. 8D is a flow diagram of a checkout_read operation that is used in connection with the Directory Table 110. The checkout_read operation is used to obtain a copy of a block from the Directory Table 110 that matches a particular key. Once the block is checked out from the Directory Table 110, the block can be read and used by the process that checked it out, but by no other process. Thereafter, to make the block available to other processes, the block is checked back in. Complementary checkout check-in processes are used in order to ensure that only one process at a time can modify a Directory Table block, a mechanism that is essential to ensure that the Directory Table always stores accurate information about objects in the cache. Thus, it will be apparent that the checkout and check-in processes is a primitive process that assists in searching the cache for a particular object.

As indicated in FIG. 8D, the checkout_read operation receives a key value as input. In the preferred embodiment, the input key value is a subkey portion of a name key 62 that corresponds to an object name.

Because the object store will be modifying portions of memory and disk data structures, it needs to guarantee a brief period of mutual exclusion to a subset of the cache data structures in order to achieve consistent results. The cache data structures are partitioned into 256 virtual "slices", selected by 8 bits of the key. Each slice has an associate mutex lock. In step 832, the process seeks to obtain the lock for the input key. If a lock cannot be obtained, the process waits the brief time until it becomes available. A lock can be unavailable if another transaction is modifying the small about of memory state associated with a key that falls in the same slice.

When a lock is obtained, the input key becomes unavailable for use by other processes. In step 834, the process determines which set 110a–110n of the Directory Table 110 corresponds to the key. The process then locates one of the block lists 132a, 132b of the Open Directory 130 that corresponds to the set of the Directory Table 110, by associating the value of a subkey of the input key with one of the block lists. In step 836, the process scans the blocks in the selected block list of the Open Directory 130, seeking a match of the input key to a key stored in one of the blocks.

If a match is found, then in step 838 the process tests whether the matching block is currently in the process of being created or destroyed by another process. If the matching block is currently in the process of being created or destroyed, then in step 840 an error message is returned to the protocol engine 70 indicating that the current block is not available.

On the other hand, if the matching block is not currently in the process of being created or destroyed, then the block can be used. Accordingly, in step 842 the process increments a read counter. The read counter is an internal variable, associated with the block, that indicates the number of processes or instances of programmatic objects that are reading the block. Such processes or objects are called "readers." In step 844, the process obtains a copy of the block, and returns it to the calling program or process.

If a match is not found in the scan of step 836, then in step 846, the process invokes a search of the Directory Table, seeking a match of the key to a set and block of the Directory Table using a process that is described further herein. If no match of the key is found in the search, then in step 848 the process returns an error message to the calling program or process, indicating that the requested object does not exist in the cache. Although the specific response to such a message is determined by the calling program or process, in the World Wide Web context, generally the proxy 30 contacts the server 40 that stores the object using an HTTP request, and obtains a copy of the requested object.

If a match is found during the Directory Index lookup of step 846, then in step 850 a corresponding block is added to the Open Directory. This is carried out by creating a new Open Directory block in main memory; initializing the block by copying information from the corresponding Directory Index block; and adding a reference to the new block to the corresponding list of blocks 132*a*, 132*b*.

8. CHECKOUT WRITE OPERATION

Figure 8E:
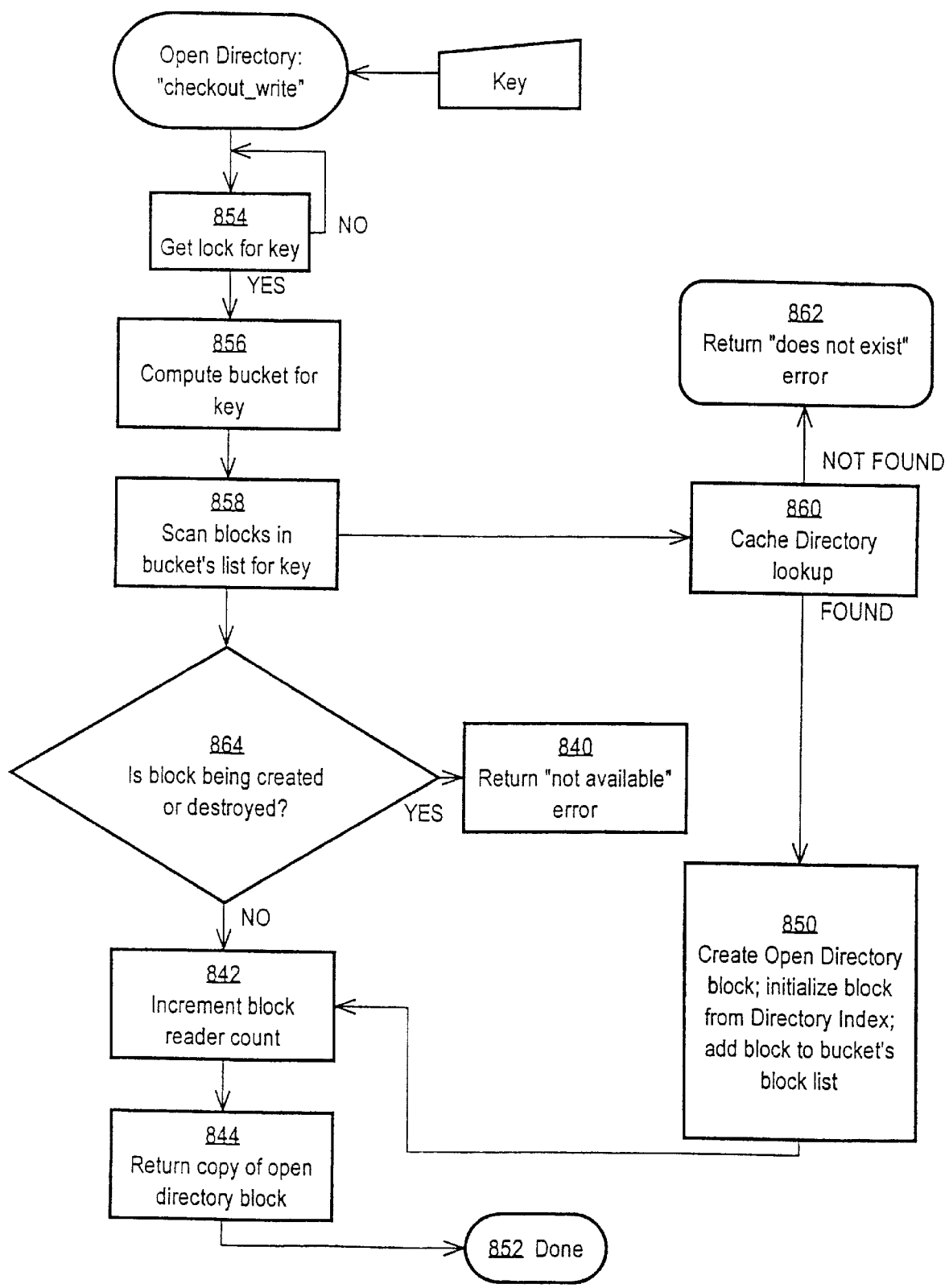
FIG. 8E is a flow diagram of a "checkout_write" process.

FIG. 8E is a flow diagram of a checkout_write process or operation that is used in connection with the Open Directory 130. The checkout_write operation is used to obtain a copy of a block from the Open Directory 130 that matches a key that is passed to the process, for the purpose of modifying or updating the contents of the block, or an object or vector that is associated with the block. Once a block is checked out of the Open Directory 130 using checkout write, other processes can modify the block or its associated object or vector. The block is then checked back in using the checkin process described herein. Using these operations, changes are stored in the Open Directory and then propagated to the Directory Table in an orderly manner.

As indicated in FIG. 8E, the checkout_write process receives a key value as input. In the preferred embodiment, the input key value is a subkey portion of a name key 62 that corresponds to an object name. In step 854, the process seeks to obtain a lock on the designated key. If a lock cannot be obtained, the process waits until one is available.

When a lock is obtained, the key becomes unavailable for use by other processes. In step 856, the process determines which set 110*a*–110*n* of the Directory Table 110 corresponds to the key. The process then locates one of the block lists 132*a*, 132*b* of the Open Directory 130 that corresponds to the set of the Directory Table 110. In step 858, the process scans the blocks in the selected block list of the Open Directory 130, seeking a match of the input key to a key stored in one of the blocks.

If a match is found, then in step 864 the process tests whether the matching block is currently in the process of being created or destroyed by another process. If so, then in step 866 an error message is returned to the protocol engine 70 or cache 80 indicating that the current block is not available. If the matching block is not currently in the process of being created or destroyed, then the block can be used. Accordingly, in step 868 the process increments a write counter. The write counter is an internal variable, stored in association with the block, that indicates the number of processes or programmatic objects that are writing the block. In step 870, the process obtains a copy of the block, returns it to the calling program or process, and also marks the copy as being modified. The marking ensures that any changes made to the block will be reflected in the Directory Index when the Open Directory is synchronized to the Directory Index.

If a match is not found in the scan of step 858, then in step 860, the process invokes a search of the Directory Index using a process that is described further herein. If no match is found in the search, then in step 862 the process returns an error message to the calling program or process, indicating that the requested object does not exist in the cache. In the World Wide Web context, typically the calling program would contact the originating server that stores the object using an HTTP request, and obtain a copy of the requested object.

If a match is found during the Directory Index lookup of step 860, then in step 874 a corresponding block is added to the Open Directory. This is carried out by creating a new Open Directory block in main memory; initializing the block by copying information from the corresponding Directory Index block; and adding a reference to the new block to the corresponding list of blocks 132*a*, 132*b*. Control is then passed to step 868, in which the write count is incremented and the process continues as described above in connection with steps 868–870.

9. CHECKOUT CREATE OPERATION

Figure 8F:
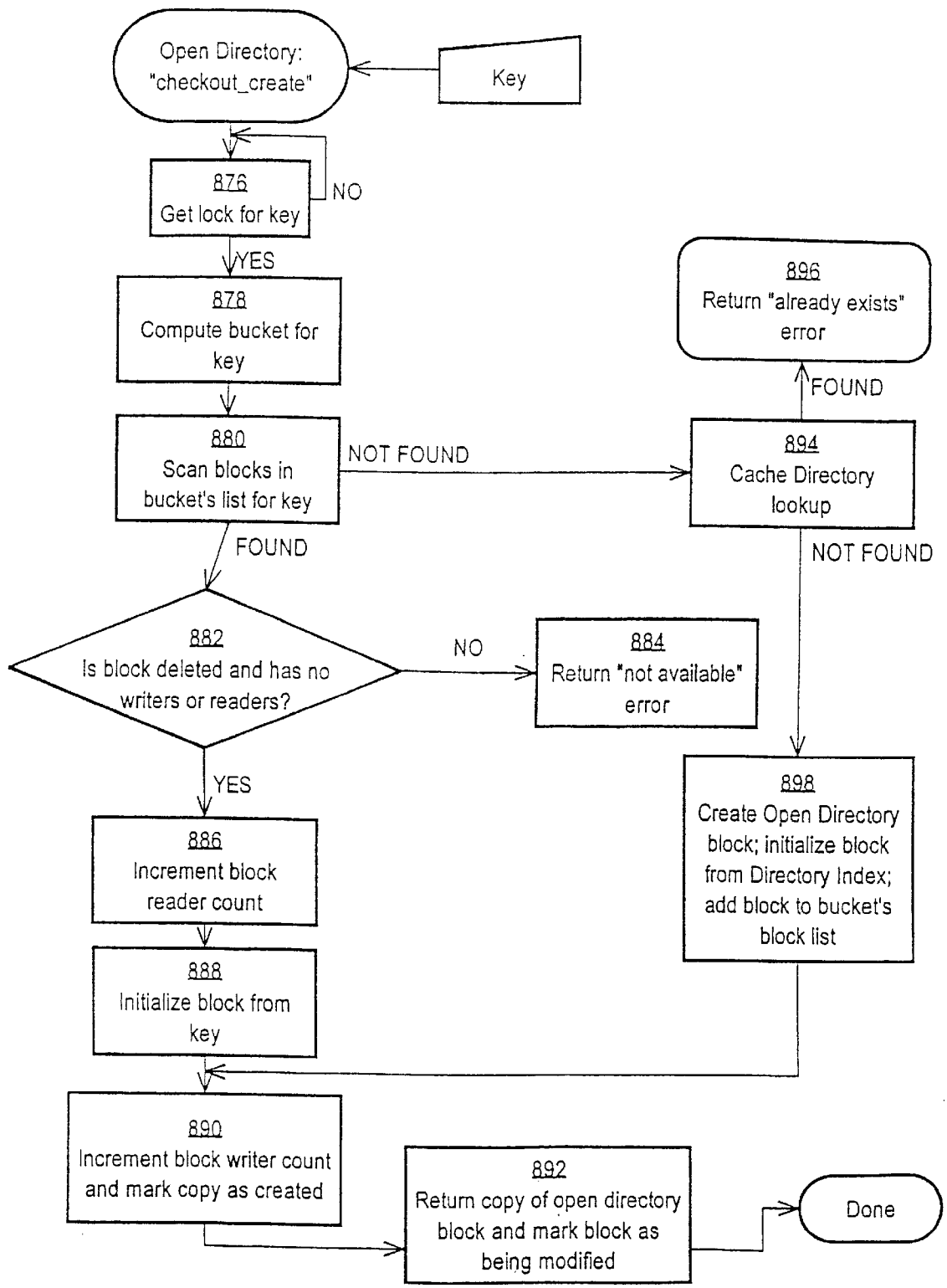
FIG. 8F is a flow diagram of a "checkout_create" process.

FIG. 8F is a flow diagram of a checkout_create operation that is supported for use in connection with the Open Directory 130. The checkout_create operation is used to create a new block in the Open Directory 130 for a name key that corresponds to a new object that is being added to the cache. Once the block is created in the Open Directory 130, the object can be obtained by users from the cache through the Open Directory 130.

As indicated in FIG. 8F, the checkout_create process receives a key value as input. In the preferred embodiment, the input key value is a subkey portion of a name key 62 that corresponds to an object name. In step 876, the process seeks to obtain a lock on the designated key. If a lock cannot be obtained, the process waits until one is available.

When a lock is obtained, the key becomes unavailable for use by other processes. In step 878, the process determines which set 110*a*–110*n* of the Directory Table 110 corresponds to the key. The process then locates the set of the Open Directory 130 that corresponds to the set of the Directory Table 110, using the set subkey bits of the input key. In step 880, the process scans the blocks in the selected block list of the Open Directory 130, seeking a match of the input key to a key stored in one of the blocks.

If a match is found, then an attempt is being made to create a block that already exists. Accordingly, in step 882 the process tests whether the matching block has been marked as deleted, and currently has no other processes reading it or writing it. If the values of both the reader counter and the writer counter are zero, then the block has no other processes reading it or writing it. If the values of either the reader counter or the writer counter are nonzero, or if the matching block has not been marked as deleted, then the block is a valid previously existing block that cannot be created. In step 884 an error message is returned to the protocol engine 70 or cache 80 indicating that the current block is not available to be created.

If the matching block is deleted and has no writers or readers accessing it, then the process can effectively create a new block by clearing and initializing the matching, previously created block. Accordingly, in step 886 the process clears the matching block. In step 888 the process initializes the cleared block by zeroing out particular fields and setting the block's key value to the key. In block 890, the process increments the writer counter associated with the block, and marks the block as created. In step 892, the process returns a copy of the block to the calling process or programmatic object, and marks the block as being modified.

If a match is not found in the scan of step 880, then no matching block currently exists in the Open Directory 130. In step 894, the process carries out a search of the Directory Index using a process that is described further herein. If a match occurs, then in step 896, the process returns an error message to the calling program or process, indicating that the block to be created already exists in the cache and cannot be deleted.

If no match is found in the search, then no matching block currently exists in the entire cache. In step 898, the process creates a new Open Directory block, and adds a reference to that block to the list 132*a*, 132*b* associated with the set value computed in step 878. Control is passed to step 890, in which the processing continues as described above in connection with steps 890–892.

10. CHECKIN PROCESS

FIG. 9B is a flow diagram of a block check-in process. The cache 80 carries out the process of FIG. 9B to check a block into the Open Directory 130 after the block is read, modified, or deleted. In an embodiment, the process of FIG. 9B is implemented as a program process or object that receives an identifier of a block as a parameter. Because the key is present in the checked out block, we do not need to pass in the key as an argument.

In step 930, the process attempts to get a lock for the key associated with the block. If no lock is available, then the process enters a wait loop until a lock is available. When a lock is available, in step 932 the process tests whether the block is being checked in after the block has been modified. If so, then in step 934 the writer count for the block is decremented, indicating that a process has completed writing the block.

In step 936, the process tests whether the check-in process has been carried out successfully. If this test is affirmative, then in step 942 the process copies the information in the current block to the corresponding original block in the Open Directory. In this way, the Open Directory is updated with any changes that were carried out by the process that modified the copy of the block that was obtained in the checkout process. Thereafter, and if the test of step 936 is negative, the process tests whether a delete check-in flag is set. The delete check-in flag indicates that the block is to be deleted after check-in. The delete flag is an argument to the checkin operation. If the flag is set, then in step 944 the process marks the block as deleted. Processing concludes at step 940.

If the test of step 932 is negative, then the block is not being modified. As a result, the only other possible state is that the block has been read. Accordingly, in step 946, the reader count is decremented.

IMPLEMENTATION OF METHODS

Figure 11:
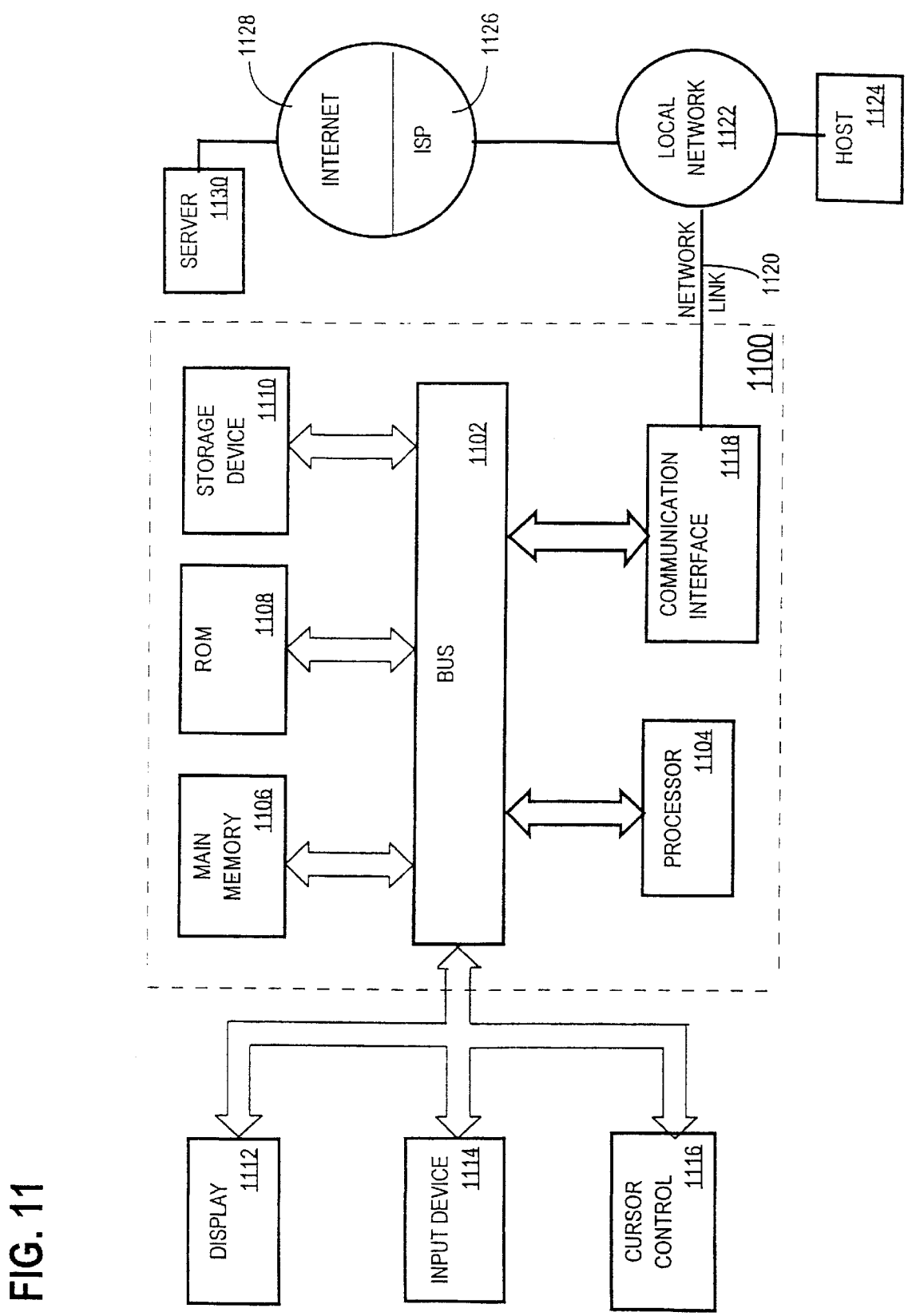
FIG. 11 is a block diagram of a computer system that can be used to implement the present invention.

In the preferred embodiment, the methods described herein are carried out using a general-purpose programmable digital computer system of the type illustrated in FIG. 11. Each of the methods can be implemented in several different ways. For example, the methods can be implemented in the form of procedural computer programs, object-oriented programs, processes, applets, etc., in either a single-process or multi-threaded, multi-processing system.

In a preferred embodiment, each of the processes is independent and re-entrant, so that each process can be instantiated multiple times when the cache is in operation. For example, the garbage collection process runs concurrently with and independent of the allocation and writing processes.

HARDWARE OVERVIEW

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for caching information objects. According to one embodiment of the invention, caching information objects is provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. In accordance with the invention, one such downloaded application provides for caching information objects as described herein.

The received code may be executed by processor 1104 as it is received, and/or stored in storage device 1110, or other non-volatile storage for later execution. In this manner, computer system 1100 may obtain application code in the form of a carrier wave.

Accordingly, an object cache has been described having distinct advantages over prior approaches. In particular, this document describes an object cache that offers high performance, as measured by low latency and high throughput for object store operations, and large numbers of concurrent operations. The mechanisms described herein are applicable to a large object cache that stores terabytes of information, and billions of objects, commensurate with the growth rate.

The object cache takes advantage of memory storage space efficiency, so expensive semiconductor memory is used sparingly and effectively. The cache also offers disk storage space efficiency, so that large numbers of Internet object replicas can be stored within the finite disk capacity of the object store. The cache is alias free, so that multiple objects or object variants, with different names, but with the same content identical object content, will have the object content cached only once, shared among the different names.

The cache described herein has support for multimedia heterogeneity, efficiently supporting diverse multimedia objects of a multitude of types with size ranging over six orders of magnitude from a few hundred bytes to hundreds of megabytes. The cache has fast, usage-aware garbage collection, so less useful objects can be efficiently removed from the object store to make room for new objects. The cache features data consistency, so programmatic errors and hardware failures do not lead to corrupted data.

The cache has fast restartability, so an object cache can begin servicing requests within seconds of restart, without requiring a time-consuming database or file system check operation. The cache uses streaming I/O, so large objects can be efficiently pipelined from the object store to slow clients, without staging the entire object into memory. The cache has support for content negotiation, so proxy caches can efficiently and flexibly store variants of objects for the same URL, targeted on client browser, language, or other attribute of the client request. The cache is general purpose, so that the object store interface is sufficiently flexible to meet the needs of future media types and protocols.

The foregoing advantages and properties should be regarded as features of the technical description in this document; however, such advantages and properties do not necessarily form a part of the invention, nor are they required by any particular claim that follows this description.

In the foregoing specification, the invention has been described with reference to specific embodiments thereof and with reference to particular goals and advantages. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of delivering an information object to a client from a cache at a server, comprising the steps of:

(A) establishing a cache table in a memory of the server, the cache table mapping name key values to vectors of alternates, wherein said information object is associated with a name key value that said cache table maps to a particular vector of said vectors of alternates;

(B) computing a content key that uniquely identifies the information object by applying a hash function to the information object; and (C) storing the content key in one of the alternates of said particular vector of alternates;

(D) computing another content key that uniquely identifies another information object by applying a hash function to said other information object, wherein said other information object is associated with said name key value; and (E) storing the other content key in another one of said alternates of said particular vector of alternates.

2. The method recited in claim 1, further comprising the steps of:

storing, in said one of the alternates, a reference to the location of the information object on a mass storage device, wherein the reference is associated with the content key.

3. The method recited in claim 1, wherein step (B) comprises the step of:

computing a content key that uniquely identifies the information object by applying a one-way hash function to the information object.

4. The method recited in claim 3, wherein step (B) comprises the step of:

computing a content key that uniquely identifies the information object by applying an MD5 one-way hash function to the information object.

5. The method recited in claim 1, further comprising the steps of:

receiving a request to retrieve the information object using the name of the information object;

looking up the information object in said cache table using the name key;

retrieving said particular vector of alternates;

selecting a content key from among the alternates of said particular vector of alternates based upon a context of the request;

looking up a location of the information object in the mass storage device based on the content key; and delivering the information object to the client.

6. The method recited in claim 1, wherein step (A) comprises the steps of:

(A1) computing the name key based upon the name of the information object and a context of a request to retrieve the information object.

7. The method recited in claim 6, wherein step (A1) comprises the steps of:

computing the name key by applying a one-way hash function to the name of the information object combined with information describing a context of a request to retrieve the information object.

8. The method recited in claim 1, wherein step (A) comprises the steps of:

computing the name key by applying a MD5 one-way hash function to the name of the information object combined with information describing a context of a request to retrieve the information object.

9. The method recited in claim 1, wherein said other information object is a version of said information object.

10. A computer-readable medium carrying one or more sequences of instructions for caching information objects, wherein execution of the one or more sequences of instructions by one or more processors causes the one or more processors to perform the steps of:

(A) establishing a cache table in a memory of the server, the cache table mapping name key values to vectors of alternates, wherein said information object is associated with a name key value that said cache table maps to a particular vector of said vectors of alternates;

(B) computing a content key that uniquely identifies the information object by applying a hash function to the information object; and (C) storing the content key in one of the alternates of said particular vector of alternates;

(D) computing another content key that uniquely identifies another information object by applying a hash function to said other information object, wherein said other information object is associated with said name key value; and (E) storing the other content key in another one of said alternates of said particular vector of alternates.

11. The computer-readable medium recited in claim 10, further comprising sequences of instructions for performing the steps of:

storing, in said one of the alternates, a reference to the location of the information object on a mass storage device, wherein the reference is associated with the content key.

12. The computer-readable medium recited in claim 10, wherein step (B) comprises the step of:

computing a content key that uniquely identifies the information object by applying a one-way hash function to the information object.

13. The computer-readable medium recited in claim 12, wherein step (B) comprises the step of:

computing a content key that uniquely identifies the information object by applying an MD5 one-way hash function to the information object.

14. The computer-readable medium recited in claim 12, further comprising sequences of instructions for performing the steps of:

receiving a request to retrieve the information object using the name of the information object;

looking up the information object in said cache table using the name key;

retrieving said particular vector of alternates;

selecting a content key from among the alternates of said particular vector of alternates based upon a context of the request;

looking up a location of the information object in the mass storage device based on the content key; and delivering the information object to the client.

15. The computer-readable medium recited in claim 10, wherein step (A) comprises the steps of:

(A1) computing the name key based upon the name of the information object and a context of a request to retrieve the information object.

16. The computer-readable medium recited in claim 15, wherein step (A1) comprises the steps of:

computing the name key by applying a one-way hash function to the name of the information object combined with information describing a context of a request to retrieve the information object.

17. The computer-readable medium recited in claim 10, wherein step (A) comprises the steps of:

computing the name key by applying a MD5 one-way hash function to the name of the information object combined with information describing a context of a request to retrieve the information object.

18. The computer-readable medium recited in claim 10, wherein said other information object is a version of said information object.

19. A method for caching data objects, the method comprising the steps of:

establishing a first mapping between name hash key values, which are generated by applying a hash function to names associated with said data objects, and a first set of storage locations;

establishing a second mapping between content hash key values, which are generated by applying a hash function to the content of said data objects, and a second set of storage locations;

storing said content hash key values in said first set of storage locations; and storing said data objects in said second set of storage locations.

20. The method of claim 19 wherein:

the first mapping maps a first name hash key value to a particular first storage location within said first set of storage locations;

said first name hash key value is associated with a first name for a particular data object;

the method further comprises the step of locating said particular data object in response to a first request by performing the steps of:
  using said first mapping and said first name hash key value to locate said particular first storage location;
  reading a content hash key value located at said particular first storage location;
  using said second mapping and said content hash key value to locate a particular second storage location within said second set of storage locations; and
  reading said particular data object from said particular second storage location.

21. The method of claim 20 wherein:

said first mapping also maps a second name hash key value to said particular first storage location;

said second name hash key value is associated with a second name for said particular data object that is different from said first name for said particular data object;

the method further comprises the step of locating said particular data object in response to a second request by performing the steps of:
  using said first mapping and said second name hash key value to locate said particular first storage location;
  reading said content hash key value located at said particular first storage location;
  using said second mapping and said content hash key value to locate said particular second storage location within said second set of storage locations; and
  reading said particular data object from said particular second storage location.

22. The method of claim 19 wherein:

said second set of storage locations is a part of a cache; and the steps of establishing a first mapping and storing said data objects include:
  if a particular data object has a plurality of alternative names, then
    (A) storing the particular object at only one location within said cache, and
    (B) mapping, within said first mapping, a plurality of name hash key values, which correspond to said plurality of alternative names, to one or more storage locations within said first set of storage locations, wherein each of said one or more storage locations contains a content hash key value that said second mapping maps to said one location where said particular data object is located.

23. A computer-readable medium carrying one or more sequences of instructions for caching data objects, wherein execution of the one or more sequences of instructions by one or more processors causes the one or more processors to perform the steps of:

establishing a first mapping between name hash key values, which are generated by applying a hash function to names associated with said data objects, and a first set of storage locations;

establishing a second mapping between content hash key values, which are generated by applying a hash function to the content of said data objects, and a second set of storage locations;

storing said content hash key values in said first set of storage locations; and storing said data objects in said second set of storage locations.

24. The computer-readable of claim 23 wherein:

the first mapping maps a first name hash key value to a particular first storage location within said first set of storage locations;

said first name hash key value is associated with a first name for a particular data object;

the computer-readable media further comprises instructions for performing the step of locating said particular data object in response to a second request by performing the steps of:
  using said first mapping and said first name hash key value to locate said particular first storage location;
  reading a content hash key value located at said particular first storage location;
  using said second mapping and said content hash key value to locate a particular second storage location within said second set of storage locations; and
  reading said particular data object from said particular second storage location.

25. The computer-readable of claim 24 wherein:

said first mapping also maps a second name hash key value to said particular first storage location;

said second name hash key value is associated with a second name for said particular data object that is different from said first name for said particular data object;

the computer-readable media further comprises instructions for performing the step of locating said particular data object in response to a second request by performing the steps of:
  using said first mapping and said second name hash key value to locate said particular first storage location;
  reading said content hash key value located at said particular first storage location;
  using said second mapping and said content hash key value to locate said particular second storage location within said second set of storage locations; and
  reading said particular data object from said particular second storage location.

26. The computer-readable of claim 23 wherein:

said second set of storage locations is a part of a cache; and the steps of establishing a first mapping and storing said data objects include:
  if a particular data object has a plurality of alternative names, then
    (A) storing the particular object at only one location within said cache, and
    (B) mapping, within said first mapping, a plurality of name hash key values, which correspond to said plurality of alternative names, to one or more storage locations within said first set of storage locations, wherein each of said one or more storage locations contains a content hash key value that said second mapping maps to said one location where said particular data object is located.

* * * * *